United States Patent [19]
Tanikawa et al.

[11] Patent Number: 5,610,957
[45] Date of Patent: Mar. 11, 1997

[54] REACTOR CORE COOLANT FLOW RATE CONTROL SYSTEM FOR A BWR TYPE NUCLEAR POWER PLANT

[75] Inventors: Naoshi Tanikawa; Tetsuya Miyakawa; Hitoshi Sakuma; Toichi Shida; Kimiko Isono, all of Hitachi, Japan

[73] Assignees: Hitachi, Ltd., Tokyo; Hitachi Engineering Co., Ltd., Ibaraki-ken, both of Japan

[21] Appl. No.: 506,963

[22] Filed: Jul. 28, 1995

[30] Foreign Application Priority Data

Jul. 31, 1994 [JP] Japan ................................. 6-197430
Mar. 3, 1995 [JP] Japan ................................. 7-070791

[51] Int. Cl.[6] ............................................................ G21C 7/32
[52] U.S. Cl. .......................... 376/210; 376/247; 376/358; 376/379; 376/404; 376/407
[58] Field of Search ............................. 376/297, 247, 376/258, 210, 379, 242, 245, 352, 404, 407; 976/DIG. 197, DIG. 207, DIG. 202

[56] References Cited

U.S. PATENT DOCUMENTS

| | | | |
|---|---|---|---|
| 3,621,926 | 2/1968 | Townsend | 376/372 |
| 3,643,437 | 2/1972 | Birnbaum et al. | 60/73 |
| 3,950,220 | 4/1976 | Holz | 376/391 |
| 4,278,051 | 7/1981 | Shida | 122/406 |
| 4,302,288 | 11/1981 | Youngborg | 376/210 |
| 4,440,715 | 4/1984 | Sato et al. | 376/210 |
| 4,650,633 | 3/1987 | Youngborg | 376/210 |
| 4,896,101 | 1/1990 | Cobb | 324/73.1 |
| 4,975,238 | 12/1990 | Regan et al. | 376/216 |
| 5,124,115 | 6/1992 | Dillmann | 376/372 |

*Primary Examiner*—Charles T. Jordan
*Assistant Examiner*—Meena Chelliah
*Attorney, Agent, or Firm*—Antonelli, Terry, Stout & Kraus, LLP

[57] ABSTRACT

A reactor core coolant flow rate control system for a BWR type nuclear power plant in which electric power is generated by a turbine-driven generator driven by a steam turbine rotating under the work of a main steam generated from a cooling water recirculated through a boiling water reactor includes an internal pump driving unit comprised of an electric motor driven by an electric power generated by the turbine-driven generator, a fluid coupling for transmitting an output torque of the electric motor and a variable-frequency generator whose rotation number is changed in accordance with the torque transmitted by way of the fluid coupling, a fluid coupling control signal generating unit for generating a fluid coupling control signal for the fluid coupling in response to at least one of deviation in a load and a rotation speed of the turbine-driven generator and deviation in a rotation speed of the internal pumps, and a plurality of internal pumps for recirculating the cooling water. Each of the internal pumps is connected to the variable-frequency generator of the internal pump driving unit and driven by an output power of the variable-frequency generator. Rotation number of the internal pump changes in dependence on the rotation number of the variable-frequency generator. The fluid coupling changes a transmission efficiency for the torque transmitted to the variable-frequency generator from the driving motor in response to the fluid coupling control signal.

28 Claims, 18 Drawing Sheets

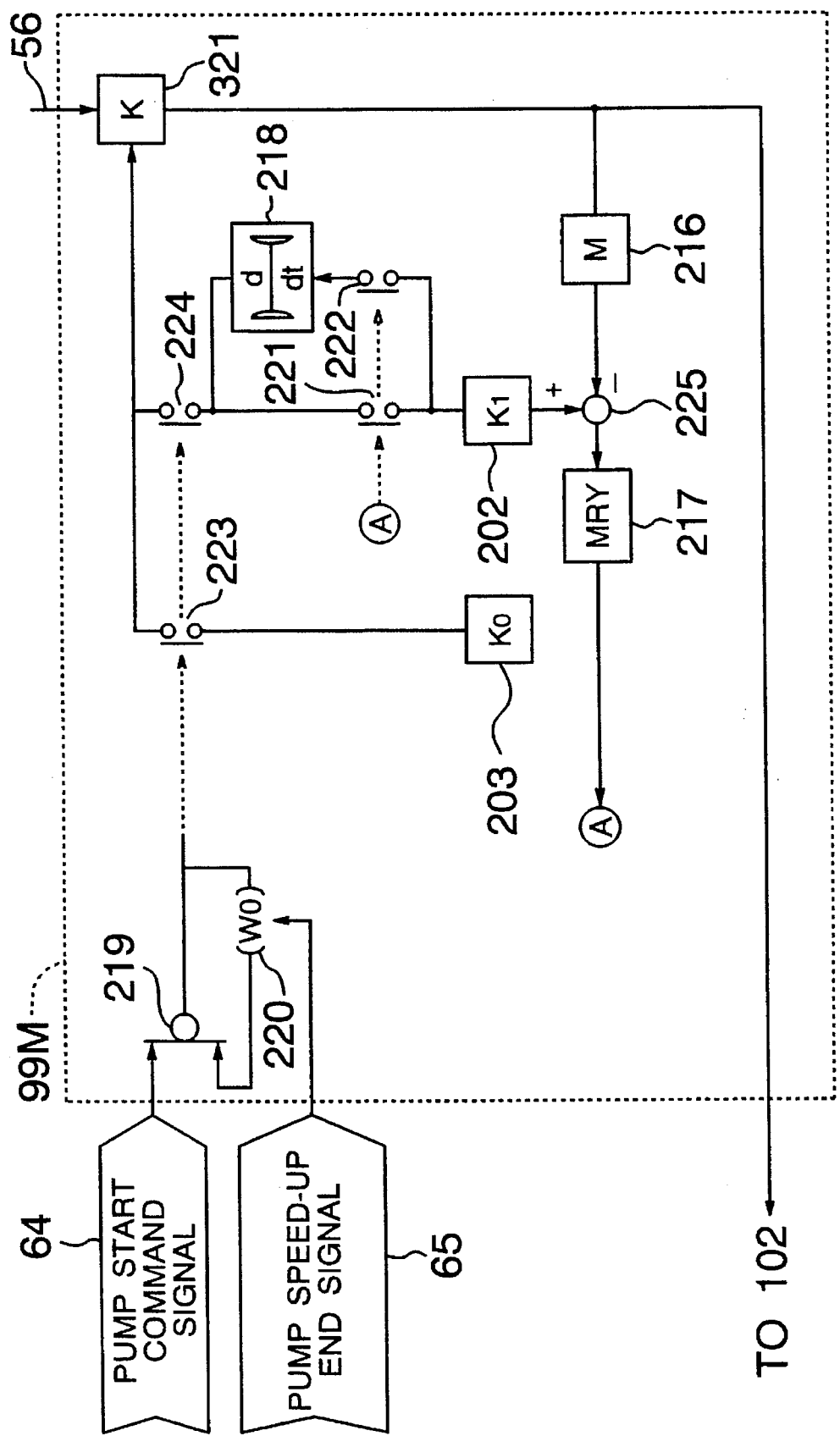

REACTOR CORE COOLANT FLOW RATE CONTROL SYSTEM FOR A BWR TYPE NUCLEAR POWER PLANT

BACKGROUND OF THE INVENTION

The present invention relates generally to a reactor core coolant flow rate control system for a boiling water reactor type nuclear power plant in which internal pumps (recirculation pumps) are adopted for forcively feeding or recirculating a coolant or cooling water through a reactor vessel containing a core including a fuel assembly for thereby generating a steam to rotate a steam turbine driving an electric generator.

As typical examples of the conventional reactor core coolant flow rate control system for the boiling water reactor type nuclear power plant (hereinafter referred to as the BWR type nuclear power plant) in which internal pumps are employed, there can be mentioned those disclosed, for example, in JP-A-3-77959 (hereinafter referred to as the literature #1), JP-A-5-18396 (hereinafter referred to as the literature #2) and a drawing FIG. 9, 4-3 annexed to "WRITTEN APPLICATION FOR ALTERATION OF KARIBA NUCLEAR POWER PLANT REACTOR INSTALLATION IN KASHIWAZAKI, JAPAN" (hereinafter referred to as the literature #3). As can be seen in FIG. 1 of the accompanying drawings, the reactor core coolant flow rate control which is system disclosed in the literature #3 is comprised of ten recirculation or internal pumps 3-1 to 3-10 provided in association with ten variable-frequency power supply units (inverter units) 423A-1 to 423A-5 and 423B-6 to 423B-10, respectively, four input transformers 421A, 422A, 421B and 422B, two AC motors 403A and 403B, two AC generators 405A and 405B, two plant or house transformers 20-1 and 20-2, and circuit breakers 412A, 424A, 412B and 424B. For convenience of the description, a combination of the motor 403A and the generator 405A as well as a combination of the motor 403B and the generator 405B will hereinafter simply be referred to as the motor/generator sets, respectively. Furthermore, a reference numeral 7 denotes an AC generator driven by a steam turbine which is rotating under the work of a steam generated within a BWR (nor shown).

The output power generated by the turbine-driven generator 7 undergoes a voltage transformation through is transformed by the house transformers 20-1 and 20-2 to be supplied to the motor/generator sets (403A/405A and 403B/405B) by way of the motor/generator set trip circuit breakers 412A and 412B, respectively, and to the input transformers 422A and 421B via the associated circuit breakers 424A and 424B, wherein the outputs from the motor/generator sets (403A/405A and 403B/405B) are inputted to the input transformers 421A and 422B, respectively. The powers outputted from the input transformers 421A, 422A, 421B and 422B are inputted to the inverter units 423A-1 to 423A-5 and 423B-6 to 423B-10, respectively, which serve to convert the frequency of the power supplied to the internal pumps 3-1 to 3-10, respectively, for controlling the rotation speeds (rpm) of these internal pumps.

By taking advantage of the fact that each of the motor/generator sets (403A/405A and 403B/405B) has a mechanical inertia, such an arrangement is adopted that even when the power supply for the reactor core coolant flow rate control system is subjected to external disturbance due to occurrence of a failure or fault in the power transmission system of the nuclear power plant, the power supply to the inverter units 423A-1 to 423A-5 and 423B-6 to 423B-10 can be maintained for a predetermined period in succession to the occurrence of such disturbance, for thereby allowing the reactor core to be continuously cooled. At this juncture, it should however be noted that each of the motor/generator sets 403A/405A and 403B/405B itself has neither the function nor capability for converting the frequency of the power supplied to the internal pumps 3-1 to 3-3 and 3-8 to 3-10. The frequency conversion is preformed by the variable-frequency power source units 423A-1 to 423-3 and 423B-8 to 423B-10 which are constituted by the inverter units, respectively, as mentioned previously. Parenthetically, the inverter unit can exhibit substantially no mechanical inertia. The circuit breakers 412A, 424A, 412B and 424B are installed for the purpose of protection of the machines and units disposed downstream thereof.

SUMMARY OF THE INVENTION

The conventional internal pump-equipped reactor core coolant flow rate control system for the BWR type nuclear power plant, however, suffers from problems which will be elucidated below. Let's assume that there takes place a phenomenon or event that a bus voltage lowers for a short time (e.g. on the order of several hundred seconds) due to a fault in a power transmission system and is restored to a normal bus voltage after the lapse of the above-mentioned time (this event will be referred to as the momentary service interruption). In that case, for the six internal pumps 3-1 to 3-3 and 3-8 to 3-10 connected to the two systems each including the motor/generator set, the input voltages for the inverter units 423A-1 to 423A-3 and 423B-8 to 423B-10 can be protected against lowering because of high mechanical inertia of the motor/generator sets. Consequently, the speed of the internal pumps mentioned above can avoid the lowering. Thus, a predetermined coolant (cooling water) flow can be ensured for the reactor core by the aforementioned internal pumps, which in turn allows continuation of operation of the nuclear power plant. On the other hand, for the four internal pumps 3-4, 3-5, 3-6 and 3-7 connected to the two systems including no motor/generator set, there can scarcely be expected the mechanical inertia. Thus, the input voltage to the inverter units 423A-4, 423A-5, 423B-6 and 423B-7 drops under the direct influence of the bus voltage drop. As a result of this, the speed of the associated internal pumps will be lowered, whereby the overall flow rate of the coolant (i.e., cooling water) recirculated through the reactor core by the internal pumps will decrease. This in turn means that the output power of the nuclear reactor can not avoid decreasing which equivalently corresponds to that of the overall reactor core coolant flow (e.g. decreasing by ca. 20%). Of course, this is undesirable from the viewpoint of ensuring the stable electric power supply.

Moreover, there may occur such an event that the bus voltage instantaneously becomes zero due to a fault in the power transmission system and a lot of time is taken for restoring the bus voltage to the normal level. This sort of event is known as the loss of external power supply. Hereinafter, this event will also be referred to as the long-term service interruption. Upon occurrence of the loss of the external power supply (i.e., long-term service interruption), the four internal pumps equipped with no motor/generator set will instantaneously be tripped simultaneously with the loss of the external power supply. Certainly, the other six internal pumps each equipped with the motor/generator set are not instantaneously tripped because of the mechanical inertia thereof. However, they will be tripped after the time lapse of about three seconds from the occurrence of the external power supply loss. In this case, the flow rate of the cooling water flowing through the reactor core will drop steeply or abruptly because of low inertia of the internal pumps. The abrupt or steep decreasing of the coolant flow rate in the reactor core will incur transition boiling of the reactor fuel, giving rise to a serious problem from the view point of securing soundness or stability of the reactor fuel.

Another problem of the conventional system can also be seen in the case where the bus voltage lowers gradually due to fluctuation of the frequency of the power transmission system or for other reason. In that case, the input voltage to all the inverter units will decrease gradually. In this conjunction, it is to be mentioned that when the voltage drop mentioned above attains a certain preset value (e.g. 80% of the rated input voltage), the inverter unit spontaneously stops the operation thereof for the purpose of protecting the inverter unit itself as well as associated machines and instruments. This means that all the inverter units may simultaneously be tripped, which is, of course, most undesirable from the standpoint of ensuring soundness (healthiness) or stability of the reactor core, incurring another difficult problem.

Furthermore, in the inverter system adopted in the hitherto known reactor core flow rate control system, it is necessary to install one inverter unit for each of the internal pumps, wherein each inverter unit has to be equipped with an air conditioning system. Additionally, a vibration-proof feature has to be secured for all the inverter units. Thus, the reactor core coolant flow rate control systems known heretofore also suffer a problem that the system as a whole becomes very expensive and complicate.

In the light of the state of the art described above, it is an object of the present invention to provide a reactor core coolant flow rate control system for a BWR type nuclear power plant which can avoid the shortcomings of the hitherto known systems such as mentioned above and which system is capable of maintaining substantially stably a power supply to the internal pumps notwithstanding of occurrence of external power supply disturbance due to a fault or like cause in the power transmission system.

Another object of the present invention is to provide a reactor core coolant flow rate control system which is capable of avoiding lowering of electric power supply to the internal pumps even upon occurrence of disturbance in the external power supply system and in which system an interlock mechanism for tripping the internal pumps upon occurrence of abnormality in the nuclear power plant can be implemented inexpensively in a simplified structure.

A further object of the present invention is to provide a reactor core coolant flow rate control system for a BWR type nuclear power plant which allows the nuclear reactor to operate stably by suppressing over-shoot of neutron flux which may occur in a starting operation mode.

In the light of the above and other objects which will become apparent as the description proceeds, there is provided according to an aspect of the present invention a reactor core coolant flow rate control system for a BWR type nuclear power plant in which electric power is generated by a turbine-driven generator driven by a steam turbine rotating under the work of a main steam generated from a cooling water recirculated through a boiling water reactor, which system includes an internal pump driving unit comprised of an electric motor driven by an electric power outputted from the turbine-driven generator, a fluid coupling for transmitting an output torque of the electric motor and a variable-frequency generator whose rotation number is changed in accordance with the torque transmitted by way of the fluid coupling, a fluid coupling control signal generating unit for generating a fluid coupling control signal for the fluid coupling in response to at least one of deviation in a load and a rotation speed of the turbine-driven generator and deviation in a rotation speed of the internal pumps, and a plurality of internal pumps for recirculating the cooling water. Each of the internal pumps is connected to the variable-frequency generator of the internal pump driving unit and driven by an output power of the variable-frequency generator. Rotation number of the internal pump changes in dependence on the rotation number of the variable-frequency generator. The fluid coupling changes a transmission efficiency for the torque transmitted to the variable-frequency generator from the driving motor in response to the fluid coupling control signal.

In a preferred mode for carrying out the invention, the fluid coupling may include a scooping pipe, wherein the fluid coupling control signal is utilized for controlling a position of the scooping pipe. The fluid coupling controls the position of the scooping pipe in response to the fluid coupling control signal to thereby change correspondingly the torque transmitted to the variable-frequency generator from the electric motor of the internal pump driving means.

As mentioned above, according to the basic concept of the present invention, a combination of the driving motor, the fluid-coupling and the variable-frequency generator (hereinafter also referred to as the motor/fluid-coupling/generator set or system) is employed as the variable-frequency power supply unit which constitutes the internal pump driving unit. The motor/fluid-coupling/generator set is capable of converting or controlling the frequency of the power supply to the internal pumps by controlling properly the scooping pipe position. Besides, due to relatively large mechanical inertia of the motor/fluid-coupling/generator set, the power supply to the internal pumps whose mechanical inertia is relatively small can be sustained for a predetermined time even upon occurrence of external disturbance in the electric power transmission system, whereby the reactor core cooling function as demanded can be ensured notwithstanding of occurrence of the external disturbance mentioned above. Thus, the soundness or healthiness or stability of the reactor fuel can be assured.

In another preferred mode for carrying out the invention, the reactor core coolant flow rate control system may further include an internal pump trip circuit breaker provided at the input side of the internal pumps (i.e., at the output side of the motor/fluid-coupling/generator set or the internal pump driving unit), an internal pump driving unit trip circuit breaker disposed at the input side of the motor/fluid-coupling/generator set, and a load shutdown or disconnection detecting unit for detecting shutdown or disconnection of a load of the turbine-driven generator to thereby output a load shutdown indicating signal to the plurality of internal pump trip circuit breakers. By virtue of this arrangement, the plurality of internal pump trip circuit breakers mentioned above can be opened in response to the load shutdown indicating signal to thereby interrupt the power supply from the internal pump driving unit to the plurality of internal pumps.

In yet another preferred mode for carrying out the invention, the reactor core coolant flow rate control system may further include a water level detecting unit for detecting a water level of the cooling water within the nuclear reactor to thereby generate a water level indication signal when the water level lowers to a predetermined level, wherein the plurality of internal pump trip circuit breakers are opened in response to the water level indication signal to thereby interrupt the power supply to the plurality of internal pumps from the internal pump driving unit.

In a further preferred mode for carrying out the invention, the reactor core coolant flow rate control system may further include a pressure detecting unit for detecting a pressure of the main steam within the nuclear reactor to thereby generate a pressure indication signal when the pressure is higher than a predetermined level inclusive thereof, wherein the plurality of internal pump trip circuit breakers mentioned above are opened in response to the pressure indication signal to thereby interrupt the power supply to the plurality of internal pumps from the internal pump driving unit.

The interlock mechanism for tripping the internal pumps upon occurrence of load shutdown of the turbine-driven generator, a high reactor pressure or a low cooling water level within the reactor can be implemented inexpensively in a much simplified structure while ensuring simple control process, when compared with the conventional control system implemented by using the inverter units.

According to another aspect of the present invention, there is provided a reactor core coolant flow rate control system for a boiling water reactor type nuclear power plant in which electric power is generated by a turbine-driven generator driven by a steam turbine rotating under the work of a main steam generated from a cooling water recirculated through a boiling water reactor, which system includes an internal pump driving unit comprised of an electric motor driven by an electric power outputted from the turbine-driven generator, a fluid coupling for transmitting an output torque of the electric motor, and a variable-frequency generator whose rotation number is changed in accordance with the torque transmitted by way of the fluid coupling, a plurality of internal pumps for recirculating the cooling water, each of the internal pumps being connected to the variable-frequency generator of the internal pump driving unit and driven by an output power of the variable-frequency generator and having a rotation number which changes in dependence on the rotation number of the variable-frequency generator, and a control unit for controlling the electric motor and the variable-frequency generator of the internal pump driving unit. The control unit includes a memory unit for storing a first conversion constant used in a normal operation for converting an output frequency of the variable-frequency generator to a voltage such that a ratio between a rated frequency and a rated voltage of the variable-frequency generator is one to one (1:1) and a second conversion constant used in a starting operation for converting the output frequency of the variable-frequency generator to a voltage such that change of the voltage is smaller relative to the change in the output frequency, and a controller for controlling the electric motor and the variable-frequency generator of the internal pump driving unit on the basis of a voltage obtained by converting the output frequency of the variable-frequency generator by using the second conversion constant stored in the memory unit for starting operation of the internal pump driving unit while controlling the electric motor and the variable-frequency generator of the internal pump driving unit on the basis of a voltage obtained by converting the output frequency of the variable-frequency generator by using a variable which varies at a predetermined rate of change as a function of time lapse from the second conversion constant to the first conversion constant when the internal pumps has attained a predetermined speed.

By virtue of the arrangement described above, it is possible to prevent the speed of the internal pumps from rising up steeply in the pump starting phase to thereby suppress variation of the reactor core coolant flow rate during the starting operation by changing over the voltage/frequency (V/f) conversion constants between the starting operation and the normal operation. Besides, owing to this feature, overshoot in the neutron flux increasing can satisfactorily be suppressed, whereby a stable nuclear reactor operation can be ensured.

The above and other objects, features and attendant advantages of the present invention will more easily be understood by reading the following description of the preferred embodiments thereof taken, only by way of example, in conjunction with the accompanying drawings.

BRIEF DESCRIPTION OF THE DRAWINGS

In the course of the description which follows, reference is made to the drawings, in which:

FIG. 17 is a circuit diagram showing another circuit configuration of voltage/frequency (V/f) converter employed in the automatic voltage regulator shown in FIG. 14, according to a further embodiment of the invention.

DESCRIPTION OF THE PREFERRED EMBODIMENTS

Figure 1:
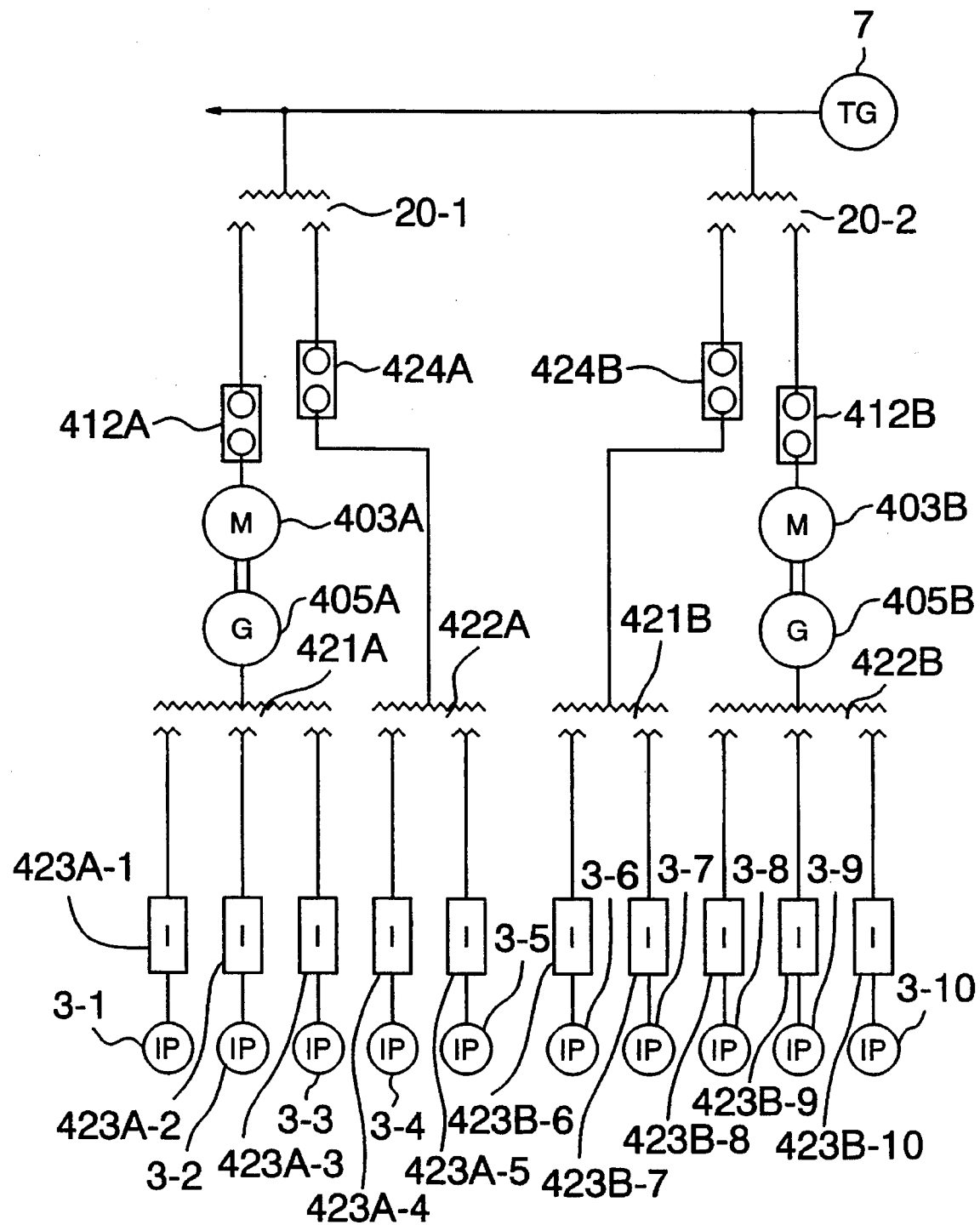
FIG. 1 is a schematic diagram showing a structure of an reactor core coolant flow rate control system for a BWR type power plant known heretofore.

Now, the present invention will be described in detail by reference to the accompanying drawings in conjunction of several preferred or exemplary embodiments of the reactor core coolant flow rate control system for a BWR type nuclear power plant including internal pump systems according to the present invention. In the following description, parts or components serving for same or equivalent functions are denoted by like reference characters and repeated descriptions thereof will be omitted, unless otherwise specified.

Figure 2:
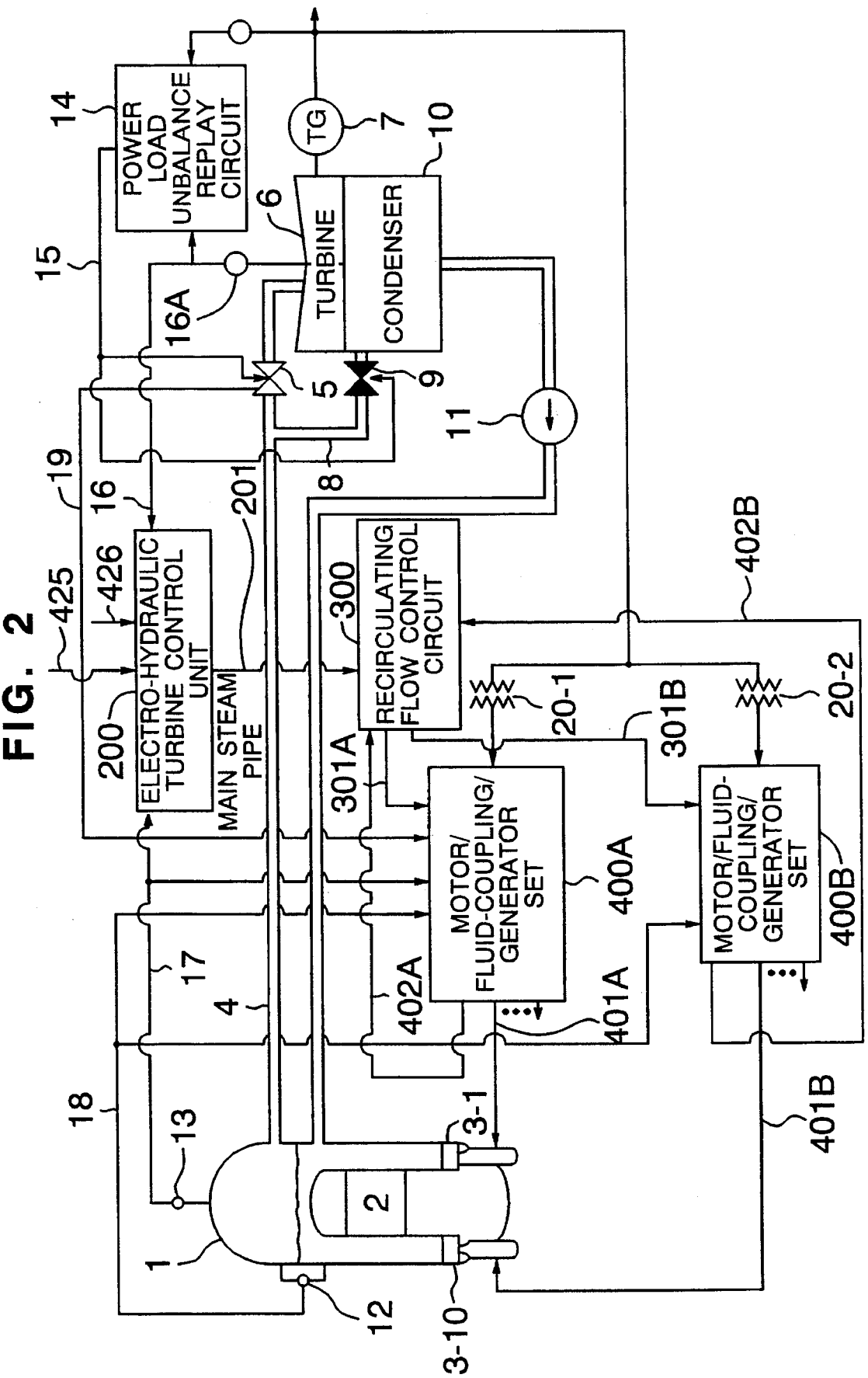
FIG. 2 is a schematic diagram showing a general arrangement of an reactor core coolant flow rate control system for a BWR type nuclear power plant including internal pumps according to an embodiment of the invention.

FIG. 2 is a schematic diagram showing a general arrangement of an reactor core coolant flow rate control system for a BWR type nuclear power plant according to an exemplary embodiment of the invention.

Referring to FIG. 2, a coolant (i.e., cooling water) is fed to a reactor core 2 disposed within a reactor pressure vessel 1 by means of ten internal or recirculation pumps, although only the two pumps 3-1 to 3-10 are shown in the figure, in order to ensure a coolant flow at a predetermined rate within the reactor core. The cooling water or coolant is heated within the reactor core 2, resulting in generation of steam within the reactor pressure vessel 1. The steam as generated flows into a steam turbine 6 via a main steam pipe 4 for doing work for rotating the steam turbine 6. The steam having done the work for rotating the steam turbine 6 is discharged to a condenser 10 to be thereby cooled and recovered as a condensate which is then fed back to the nuclear reactor pressure vessel 1 as the cooling water by means of a condensate feed pump 11. An electric generator 7 is coupled to an output shaft of by the steam turbine 6 to be thereby driven. Electric power turbine-driven generated by the generator 7 is distributed to an associated power transmission system (not shown) as well as to various equipment and instruments installed within the plant (not shown either).

Now, referring to FIG. 2, description will be made of the reactor core coolant flow rate control system according to an exemplary embodiment of the present invention in which motor/generator sets equipped with respective fluid couplings are employed and which is applied to the BWR type nuclear power plant briefed above.

The reactor core coolant flow rate control system now under consideration is comprised of an electro-hydraulic turbine control unit 200, a recirculating flow control circuit 300, and motor/generator sets each equipped with a fluid coupling which serves as a torque transmitting mechanism or internal pump driving mechanism. Hereinafter, the combination of the motor/generator set and the fluid-coupling will be referred to as the motor/fluid-coupling/generator set or system and designated generally by reference characters 400A or 400B.

Inputted to the electro-hydraulic turbine control unit 200 are a pressure setting signal 426 supplied from a pressure level setting unit (not shown) and a load setting signal 425 supplied from a load setting unit (not shown either) together with a reactor pressure signal 17 outputted from a pressure detector 13 provided in association with the reactor pressure vessel 1 for detecting the pressure therein and a turbine rotation number signal 16 supplied from a turbine speed detector 16A. The electro-hydraulic turbine control unit 200 arithmetically determines load/speed deviations to thereby output a load/speed deviation signal 201. At this juncture, it should be mentioned that the phrase "load/speed deviation signal" means representatively both a signal indicating a difference or deviation between the reactor pressure signal 17 and the pressure setting signal 426 and a signal indicating a difference or deviation between the turbine rotation number signal 16 and the load setting signal 425, respectively.

On the other hand, there are inputted to the recirculating flow control circuit 300 the load/speed deviation signal 201 together with variable-frequency generator rotation number signals 402A and 402B, which are fed back from the motor/fluid-coupling/generator systems 400A and 400B, respectively. On the basis of the load/speed deviation signal 201 and the variable-frequency generator rotation number signals 402A and 402B, the recirculating flow control circuit 300 generates scoping pipe position control signals 301A and 301B which are inputted to the motor/fluid-coupling/generator systems 400A and 400B which are supplied with electric powers from the turbine-driven generator 7 via associated house or plant transformers, respectively. In response to the scooping pipe position control signals 301A and 301B, the motor/fluid-coupling/generator systems 400A and 400B output the variable-frequency generator rotation number signals 401A and 401B to the internal pumps 3-1 to 3-10, respectively, for changing or controlling the rotation numbers thereof, respectively. Parenthetically, it should be mentioned that the motor/fluid-coupling/generator system 400A is provided in association with the internal pumps 3-1 to 3-5 for driving the same, while the motor/fluid-coupling/generator system 400B is provided in association with the internal pumps 3-6 to 3-10 for driving the same. The internal pumps are caused to rotate in synchronism with the variable-frequency generators of the associated motor/fluid-coupling/generator systems 400A and 400B in response to the rotation number signals 401A and 401B of the variable-frequency generators. The signals indicating the current rotation speeds of the variable-frequency generators of the motor/fluid-coupling/generator systems 400A and 400B are fed back to the recirculating coolant flow rate control circuit 300 as the current variable-frequency generator rotation number signals 402A and 402B.

Figure 3A:
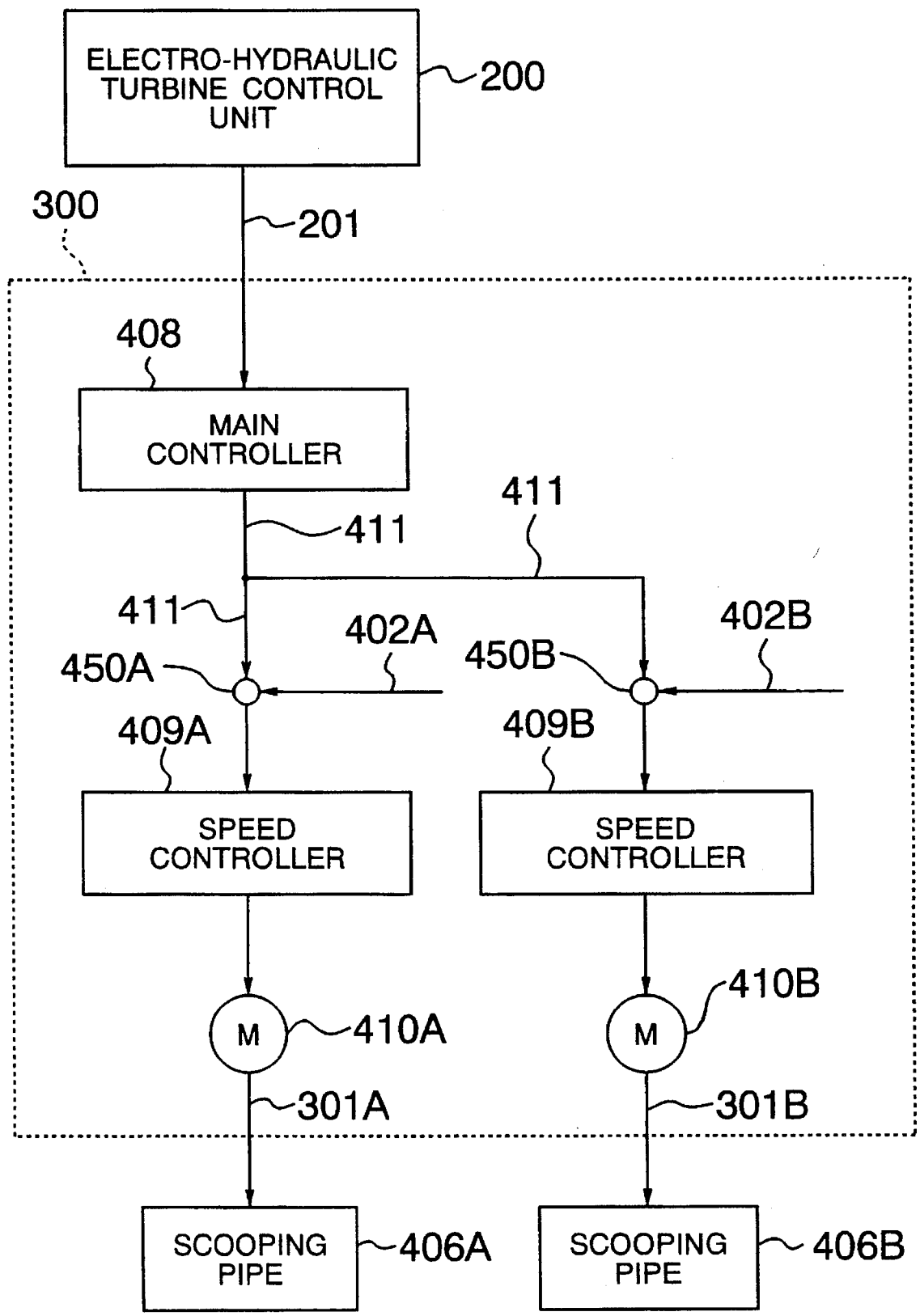
FIG. 3A is a block diagram showing a typical or exemplary structure of a recirculating flow control circuit employed in the reactor core coolant flow rate control system shown in FIG. 2.

FIG. 3A shows in detail a structure of the recirculating flow control circuit 300 in the reactor core coolant flow rate control system shown in FIG. 2.

As can be seen in FIG. 3A, the recirculating flow control circuit 300 is comprised of a main controller 408, speed controllers 409A and 409B and scooping pipe driving motors 410A and 410B.

The main controller 408 incorporated in the recirculating flow control circuit 300 serves for generating a pump speed command signal 411 on the basis of the load/speed deviation signal 201 supplied from the electro-hydraulic turbine control unit 200. The pump speed command signal 411 is branched into two signal streams which are compared with the current variable-frequency generator rotation number signals 402A and 402B, respectively, at the output side of the main controller 408 by adders 450A and 450B, whereon deviations (speed deviations) of the signals 402A and 402B from the pump speed command signal 411 is arithmetically determined. The signals indicative of the deviations, if detected, are supplied to the speed controller 409A or 409B. Speed command signals arithmetically determined by the speed controllers 409A and 409B are then supplied to the scooping pipe driving motors 410A and 410B, respectively, which respond thereto by controlling the positions of scooping pipes 406A and 406B, respectively, as indicated representatively by scooping pipe position command signals 301A and 301B, respectively.

In this manner, the recirculating flow control circuit 300 performs the position control of the scooping pipes on the basis of the load/speed deviations.

Next, by reference to FIG. 3B, description will be made of a modified recirculating flow control circuit 300M which is designed to control the positions of the scooping pipes on the basis of deviations of the internal pump rotation speeds (=rotation number/unit time, e.g. rpm). In the case of the modified recirculating flow control circuit 300M, the load/speed deviation signal 201 generated by the electro-hydraulic turbine control unit 200 is not utilized.

Figure 3B:
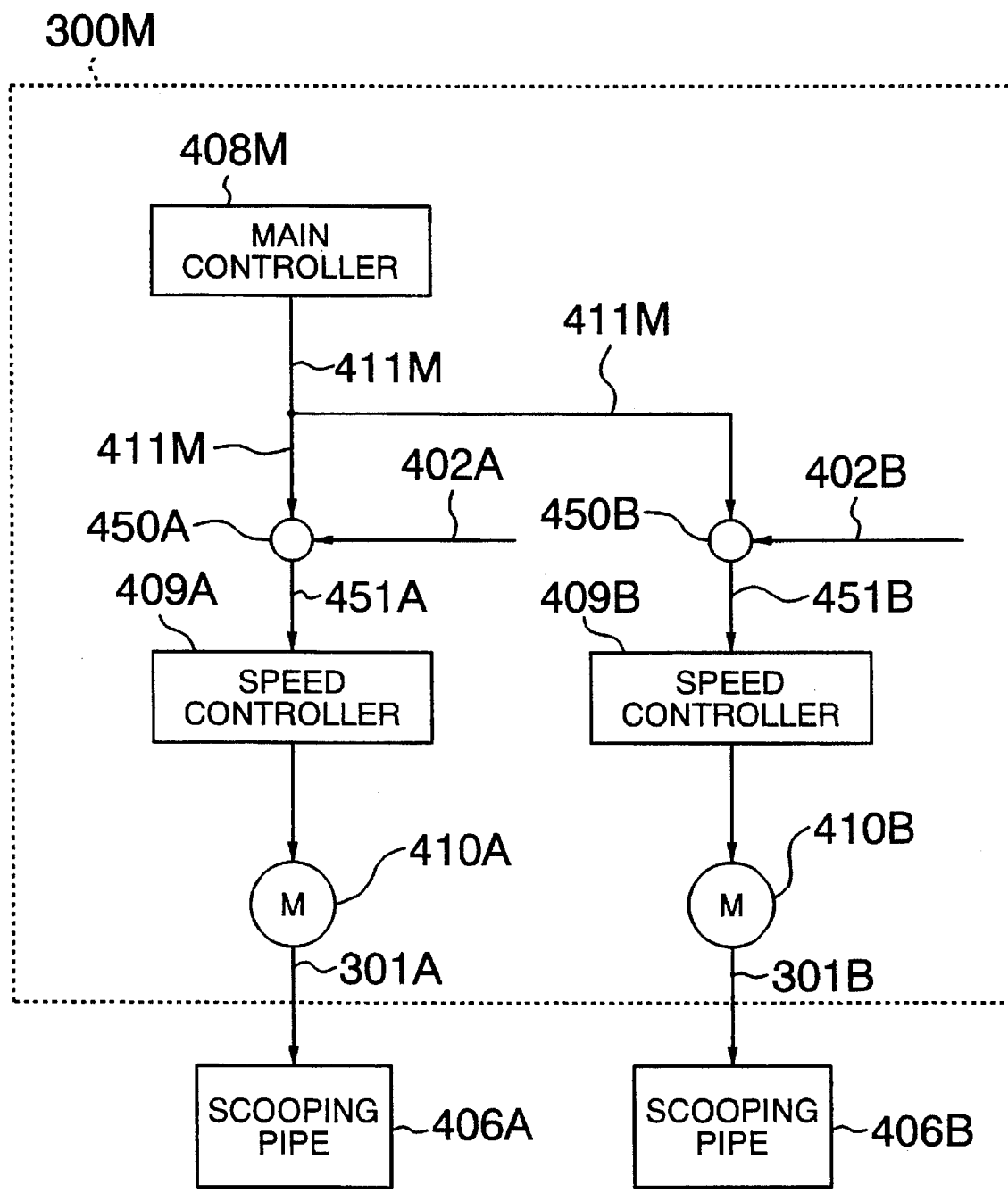
FIG. 3B is a block diagram showing another exemplary structure of a recirculating flow control circuit which can be employed in the reactor core coolant flow rate control system shown in FIG. 2.

As is shown in FIG. 3B, the modified recirculating flow control circuit 300M is comprised of a main controller 408M, the speed controllers 409A and 409B and the scooping pipe driving motors 410A and 410B.

The main controller 408M incorporated in the recirculating flow control version 300M outputs a pump speed command signal 411M which has a fixed value. The pump speed command signal 411M is also branched into a pair of pump speed command signals 411M at the output side of the main controller 408M. Adders 450A and 450B arithmetically determine differences or deviations between the current variable-frequency generator rotation number signals 402A and 402B representing equivalently the current internal pump rotation numbers and the pump speed command signal 411M to thereby output pump speed deviation signals 451A and 451B, respectively, which are then inputted to the speed controller 409A or 409B. Pump speed control signals arithmetically determined by the speed controllers 409A and 409B are inputted to the scooping pipe driving motors 410A and 410B which then respond to the pump speed control signals to thereby control the positions of the associated scooping pipes 406A and 406B, respectively, as indicated in terms of scooping pipe position control signals 301A and 301B.

The phrase "pump speed deviation" represents deviations or differences between the pump speed command signal and the variable-frequency generator rotation number signals 402A and 402B which equivalently represent the internal pump speeds. Of course, the scooping pipe is provided in association with the fluid-coupling of the motor/fluid-coupling/generator set or system.

As is apparent from the above description, the positions of the scooping pipes 406A and 406B are controlled by the recirculating flow control circuit 300 or 300M so that the speed deviation is reduced to zero. Parenthetically, the fluid-coupling control technique using the scooping pipe is described, for example, in Japanese literatures: "GENSHIRYOKU KOGYOU (NUCLEAR INDUSTRIES)", Vol. 14, No. 12 (Dec. 1968), pp. 51–54, FIG. 3 and "KEISOKU SEIGYO TO ZIDOUKA (INSTRUMENTAL MEASUREMENT/CONTROL AND AUTOMATION)": published by Karyoku Genshiryoku Hatsuden Gijutsu Kyokai (Association of Thermal/Atomic Power Generation Engineers of Japan), pp. 191–193, FIGS. 1, etc. (July, 1994).

Figure 4:
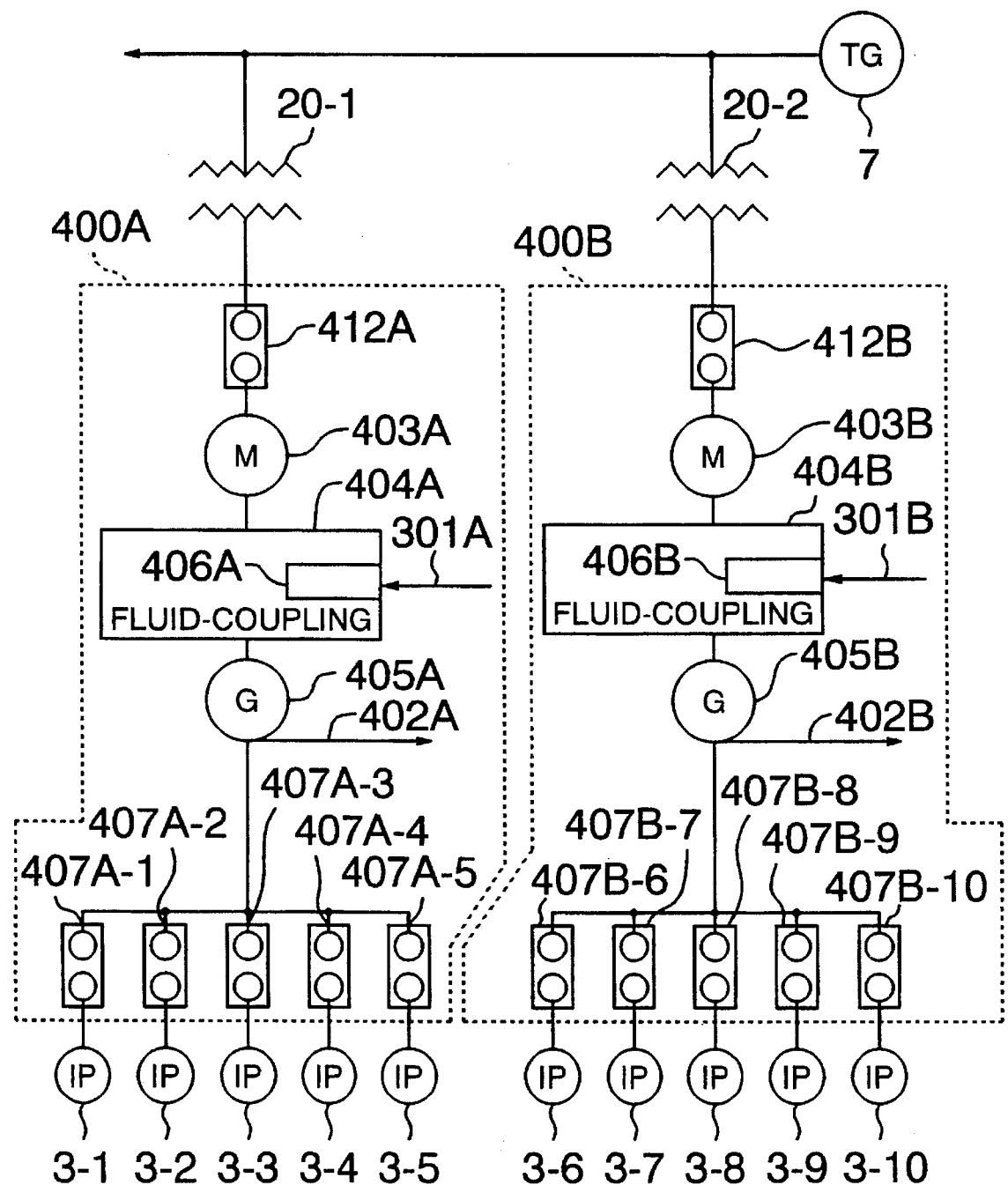
FIG. 4 is a block diagram showing in detail a typical structure of a motor/fluid-coupling/generator set shown in FIG. 2.

FIG. 4 is a block diagram showing in detail a typical structure of the motor/fluid-coupling/generator systems or sets 400A and 400B, respectively.

Referring to FIG. 4, the voltage of the electric power generated by the turbine-driven generator 7 is transformed by the house or plant transformers 20-1 and 20-2 to be subsequently inputted to motor/fluid/coupling/generator set trip circuit breakers 412A and 412B incorporated in the motor/fluid-coupling/generator sets 400A and 400B, respectively. Since these motor/ fluid-coupling/generator sets are equivalent to each other in respect to the structure and operation, the following description will be directed only to the motor/fluid-coupling/generator system or set 400A, being understood that the same holds essentially true for the motor/fluid-coupling/generator set 400B.

As is shown in FIG. 4, the motor/fluid-coupling/generator set 400A is comprised of an AC driving motor 403A driven at a predetermined constant rotation number by the electric power supplied via the house transformer 20-1, a fluid coupling 404A for transmitting a torque generated by the AC driving motor 403A to the variable-frequency generator 405A for controlling or changing the internal pump rotation number in dependence on the torque transmitted from the driving motor 403A via the fluid coupling 404A.

The fluid coupling 404A is filled with a hydraulic fluid such as oil, wherein the torque transmitted from the AC driving motor 403A to the variable-frequency generator 405A is changed by controlling the oil level within the fluid coupling 404A for thereby allowing the rotation number of the variable-frequency generator 405A to be changed. On the other hand, the control or change of the oil surface level within the fluid coupling 404A can be realized by changing correspondingly the position of the scooping pipe 406A inserted into the fluid coupling 404A. The position of the scooping pipe 406A in turn is controlled by the scooping pipe position command signal 301A issued from the recirculating flow control circuit 300, as mentioned previously. The output of the variable-frequency generator 405A of the motor/fluid-coupling/generator set 400A is branched into five signal streams fed to the internal pumps 3-1 to 3-5 by way of the internal pump trip circuit breakers 407A-1 to 407A-5, respectively, for thereby controlling the pump rotation numbers of the internal pumps 3-1 to 3-5, respectively.

Let's assume now that the load/speed deviation signal 201 elucidated hereinbefore by reference to FIG. 2 does change, involving thus a corresponding change in the scooping pipe position command signal 301A issued from the recirculating flow control circuit 300. Then, the position of the scooping pipe 406A changes correspondingly, as a result of which the oil level within the fluid coupling 404A is correspondingly changed. As a consequence, the torque transmitted to the variable-frequency generator 405A of the motor/fluid-coupling/generator set 400A from the AC driving motor 403A changes, which results in a corresponding change in the rotation number of the variable-frequency generator 405A of the motor/fluid-coupling/generator set 400A. In this way, by changing the rotation number of the variable-frequency generator 405A of the motor/fluid-coupling/generator set 400A, the rotation numbers of the internal pumps 3-1 to 3-5 provided in association with the motor/fluid-coupling/generator set 400A can be controlled. As will now be appreciated from the above, the torque transmission efficiency of the fluid coupling can be controlled by controlling the position of the scooping pipe 406A.

In FIG. 4, reference characters 407A-1 to 407A-5 designate internal pump trip circuit breakers which are disposed at the input side of the internal pumps, respectively, 3-1 to 3-5 and which serve for stopping operations of the internal pumps as well as for disconnecting from the system those internal pumps in which abnormality takes place.

In the case of the reactor core coolant flow rate control system according to the instant embodiment of the invention, it is assumed that ten internal pumps are employed in combination with two sets of the motor/fluid-coupling/generator systems. It goes however without saying that the invention is never limited to these numbers but desired numbers of the internal pumps and the motor/fluid-coupling/generator sets may be provided in appropriate or desired combinations, as occasion requires.

FIGS. 5a–5d show timing charts for graphically illustrating behaviors of the reactor core coolant flow rate control system according to the instant embodiment of the invention in which the motor/fluid-coupling/generator sets 400A and 400B are adopted as the internal pump driving mechanism by comparing with those of the conventional control system described hereinbefore by reference to FIG. 1, when a momentary (short-term) service interruption takes place in the power transmission system.

Figure 5A:
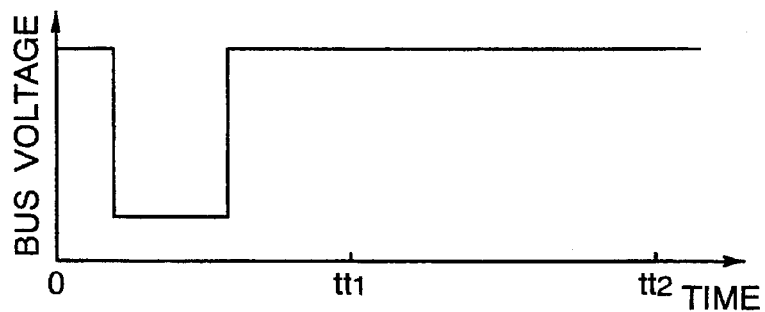
FIGS. 5a–5d show timing charts for graphically illustrating behaviors of the reactor core coolant flow rate control system according to an embodiment of the present invention in respect to bus voltage, internal pump speed, reactor core coolant flow and generator output upon occurrence of a momentary service interruption, as compared with corresponding behaviors of the conventional system.
Figure 5B:
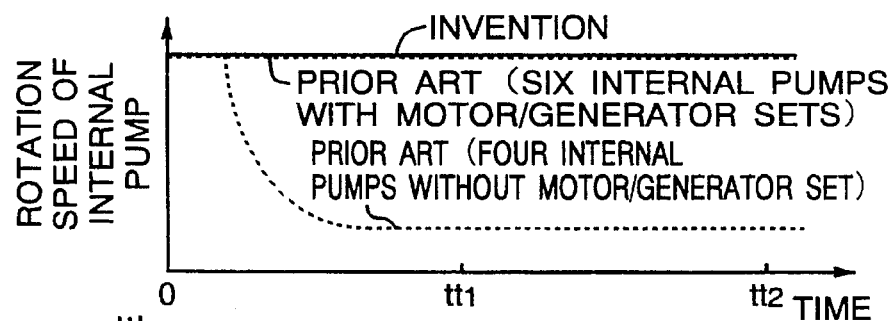
Figure 5C:
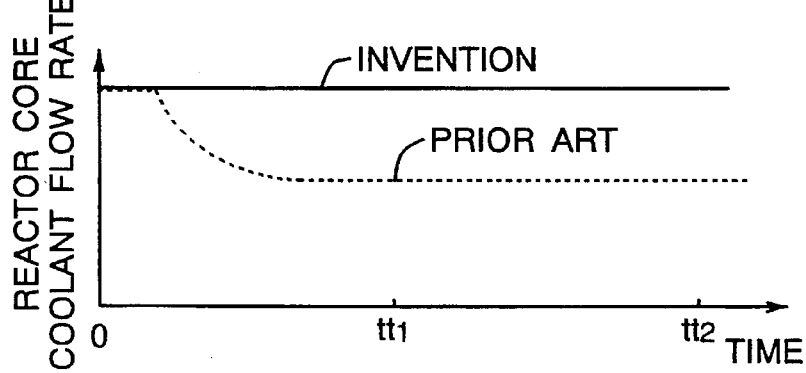
Figure 5D:
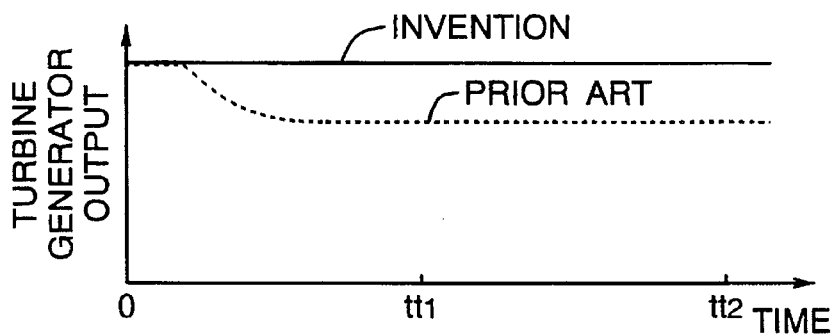

Referring to FIGS. 5a–5d, let's assume now that a momentary service interruption occurs due to a failure or other causes in the system and thus a bus voltage falls within a time period $t_1$ as indicated in FIG. 5a. In that case, in the conventional system whose behaviors are indicated by phantom line curves in FIGS. 5a–5d, the four internal pumps (3-4, 3-5, 3-6, 3-7 in FIG. 1) which are equipped with no motor/generator set are directly or straightforwardly affected by the bus voltage drop, whereby the rotation speeds of these internal pumps decreases steeply, as indicated in FIG. 5b. However, even in the case of the conventional system, the rotation speeds of other the six internal pumps (3-1, 3-2, 3-3, 3-8, 3-9, 3-10 in FIG. 1,) which are driven through the motor/generator sets (403/405, FIG. 1) are maintained substantially constant at the respective current speeds regardless of occurrence of the momentary service interruption. However, because of decrease in the rotation speeds of the first mentioned pumps, the reactor core flow rate decreases, as indicated in FIG. 5c, leading ultimately to lowering of the output power of the turbine-driven generator 7, as indicated in FIG. 5d. By contrast, in the case of the system according to the present invention whose behaviors upon occurrence of the momentary service interruption are indicated by solid line curves in FIGS. 5a–5d, both the motor/fluid-coupling/ generator sets 400A and 400B have relatively high mechanical inertia. As a consequence, the short-term bus voltage drop mentioned above brings about essentially no lowering of the voltage supplied to the individual internal pumps. Thus, the pump speed can be maintained essentially constant at a current speed, as indicated in FIG. 5b. Besides, because all the internal pumps are driven, the overall reactor core flow can be maintained substantially constant, as indicated in FIG. 5c. As a result of this, the generator output power of the turbine-driven generator 7 can be prevented from lowering notwithstanding of occurrence of the momentary service interruption, as indicated in FIG. 5d.

As can be seen from the above discussion, according to the teachings of the invention, operation of the nuclear power plant can be continued substantially stably regardless of occurrence of the momentary service interruption, whereby stable power supply can be ensured.

On the other hand, FIGS. 6a–6d show timing charts for graphically illustrating behaviors of the reactor core coolant flow rate control system according to the instant embodiment of the invention in which the motor/fluid-coupling/ generator sets 400A and 400B are adopted as the internal pump driving mechanism upon occurrence of service interruption for a long period (hereinafter referred to as the long-term service interruption), by comparing with those of the conventional system described hereinbefore by reference to FIG. 1.

Figure 6A:
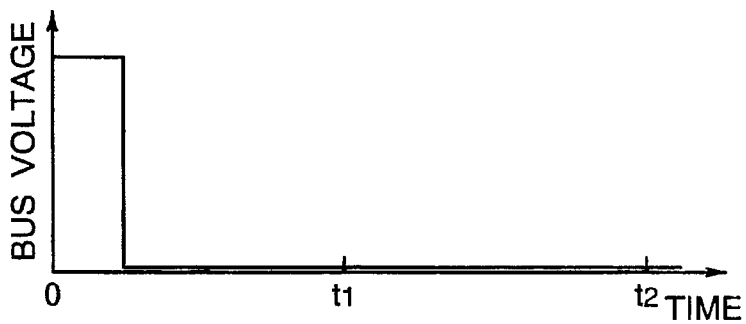
FIGS. 6a–6d show timing charts for graphically illustrating behaviors of the reactor core coolant flow rate control system according to an embodiment of the present invention in respect to bus voltage, internal pump speed, reactor core coolant flow and generator output upon occurrence of a long-term service interruption, as compared with corresponding behaviors of the conventional system.
Figure 6B:
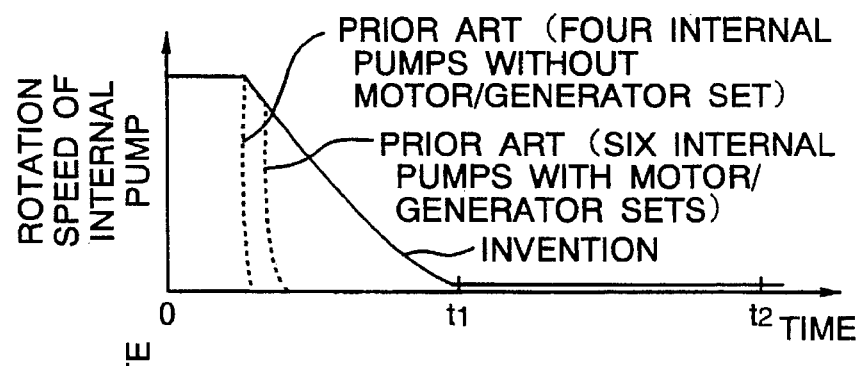
Figure 6C:
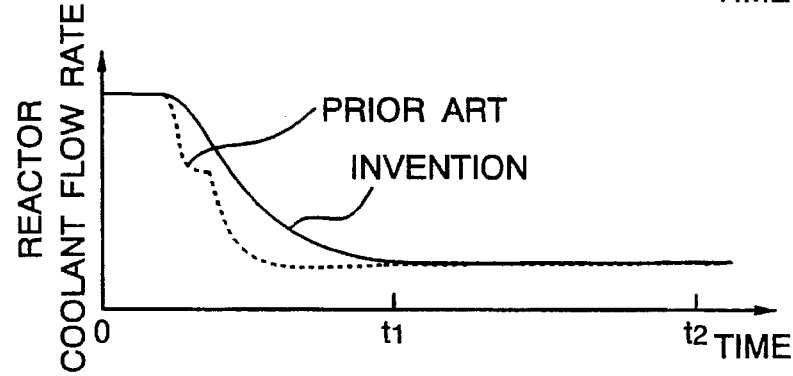
Figure 6D:
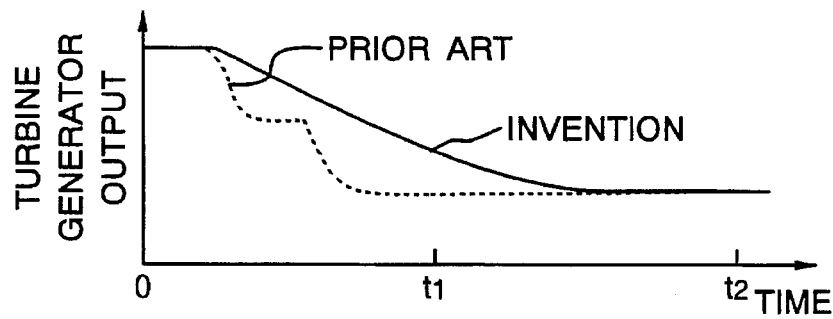

Upon occurrence of a long-term service interruption due to loss of an external power supply, the voltage to the transformers 20-1 and 20-2 becomes instantaneously zero, as indicated in FIG. 6a. In the case of the conventional system whose behaviors are illustrated by phantom line curves, the four internal pumps equipped with no motor/ generator set are tripped substantially simultaneously with the occurrence of the long-term service interruption while the other six internal pumps driven by way of the motor/ generator sets are tripped upon lapse of about three seconds after occurrence of the long-term service interruption because of the mechanical inertia of the motor/generator sets, which thus results in stoppage of rotation of the internal pumps, as indicated in FIG. 6b. Consequently, the overall reactor core flow decreases steeply, as indicated in FIG. 6c, making it difficult to ensure thermal soundness and stability of the reactor fuel. Ultimately, the output power of the turbine-driven generator 7 decreases, as indicated in FIG. 6d. By contrast, in the case of the reactor core coolant flow rate control system according to the instant embodiment of the invention of which behaviors are indicated by solid line curves in FIGS. 6a–6d and in which all the internal pumps are driven by way of the motor/fluid-coupling/generator sets or systems exhibiting large mechanical inertiae, the pump speeds of the internal pumps decrease only gently up to a time point $t_1$ in dependence on the mechanical inertia of the motor/fluid-coupling/generator sets, as indcted in FIG. 6b. As a result of this, the overall reactor core coolant flow decreases slowly, as indicated in FIG. 6c. Thus, the output power of the turbine-driven generator 7 decreases only slowly, as indicated in FIG. 6d.

As can be appreciated from the above analyses, in the reactor core coolant flow rate control system according to the instant embodiment of the present invention, steep or abrupt decreasing of the overall reactor core coolant flow upon occurrence of the long-term service interruption can be mitigated, whereby the fuel can be protected against the transitional boiling with the thermal soundness or stability thereof being ensured.

Figure 7A:
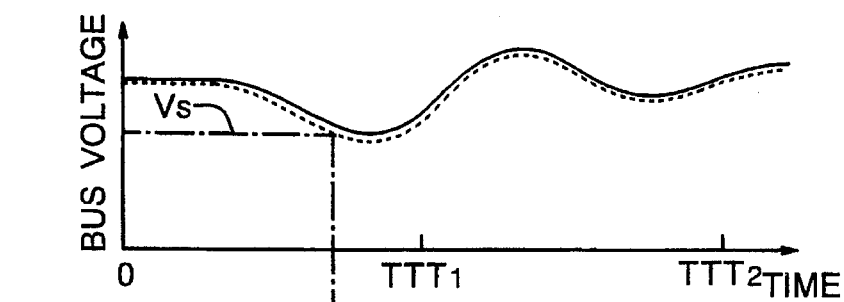
FIGS. 7a–7d show timing charts for graphically illustrating behaviors of the reactor core coolant flow rate control system according to an embodiment of the present invention in respect to bus voltage, internal pump speed, reactor core coolant flow and generator output upon occurrence of a fluctuation in electric power supply as compared with corresponding behaviors of the conventional system.
Figure 7B:
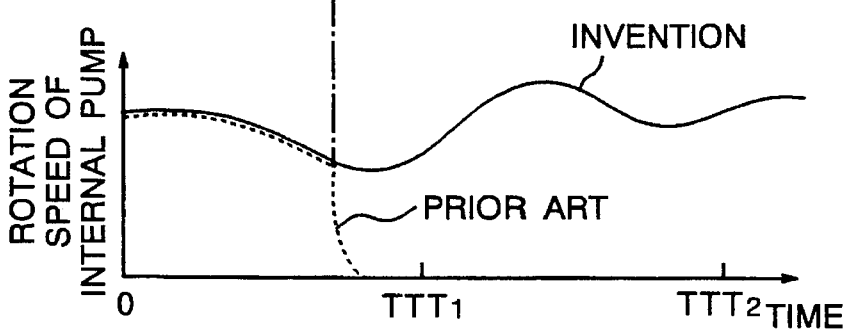
Figure 7C:
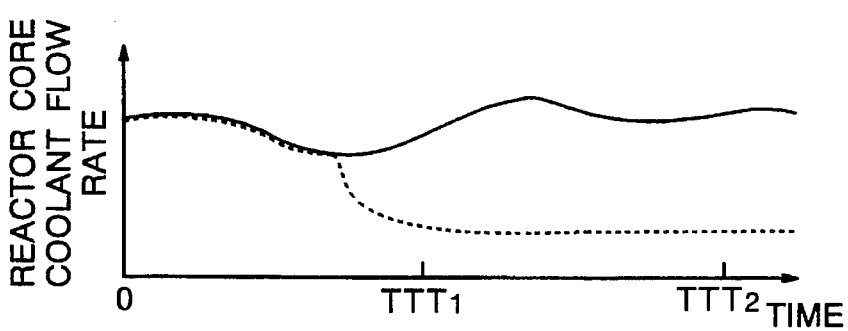
Figure 7D:
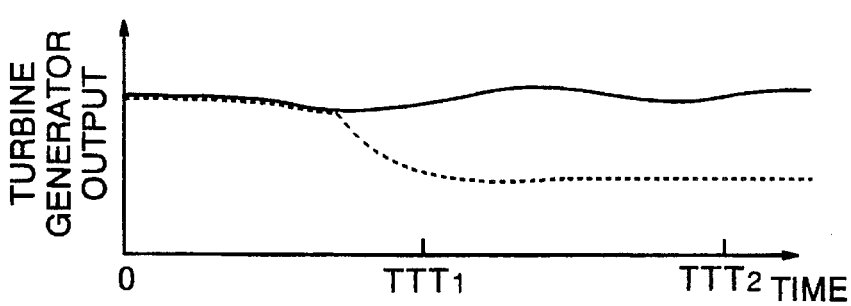

Next, a power fluctuation phenomenon will be considered. It is assumed that a bus voltage fluctuates leniently under the influence of some event in the power system, as indicated in FIG. 7a. In the case of the conventional system in which the inverter units (423, FIG. 1) are employed as the variable-frequency power supply source for the internal pump, a significant voltage drop takes place due to the power fluctuation. Thus, upon detection of falling of the input voltage to the inventer unit to a predetermined value $V_s$, the inverter unit will spontaneously stop the operation thereof owing to the self-protection function. Consequently, upon occurrence of the power fluctuation of a given magnitude, all the internal pumps may stop instantaneously the operations thereof (refer to phantom line curves shown in FIGS. 7b–7d). By contrast, in the reactor core coolant flow rate control system according to the instant embodiment of the present invention in which the motor/fluid-coupling/ generator sets are employed as the variable-frequency power supply source, the pump driving motors can be driven stably notwithstanding of fluctuations in the input voltage, whereby the variable-frequency generator can be protected against shutdown even upon occurrence of power fluctuation or variation of relatively large magnitude. Thus, the instantaneous shutdown of all the internal pumps can positively be prevented regardless of occurrence of fluctuation or variation in the voltage of the power system (see solid line curves shown in FIGS. 7b–7d).

In this way, decreasing of the overall reactor core coolant flow can be mitigated as in the case of the long term service interruption, whereby thermal soundness or stability of the fuel can be ensured with high reliability.

Next, another embodiment of the present invention will be described which is directed to an interlock mechanism for the reactor core coolant flow rate control system for the BWR type nuclear power plant upon occurrence of abnormality such as disconnection or shutdown of load of the turbine-driven generator.

The interlock mechanism according to the instant embodiment of the invention is comprised of a power load unbalance relay circuit 14, a governing valve 5 installed in the main steam pipe 4, a bypass valve 9 installed in a bypass pipe 8 and a motor/fluid-coupling/generator set 400A.

Inputted to the power load unbalance relay circuit 14 are a turbine rotation number signal 16 indicating the rotation number of the steam turbine 6 and a signal indicating the output power of the turbine-driven generator 7, wherein both of these signals are compared with each other in the power load unbalance relay circuit 14. Upon occurrence of disconnection or shutdown of a load of the turbine-driven generator 7, difference between both the signals mentioned above will exceed a preset value. In response thereto, the power load unbalance relay circuit 14 outputs a governing valve quick-closing/bypass valve quick-opening command signal 15 for closing quickly the governing valve 5 while opening quickly the bypass valve 9 for suppressing the turbine rotation number from increasing. When the governing valve 5 is quickly closed with the bypass valve 9 being quickly opened concurrently, the main steam is bypassed to the condenser 10 via the bypass pipe 8, whereby increase of the reactor pressure otherwise brought about by the closing of the governing valve 5 is suppressed. Furthermore, upon quick closing of the governing valve 5, a governing valve closure signal 19 is generated form a detector (not shown) provided in association with the governing valve 5, wherein the governing valve closure signal 19 is inputted to the motor/fluid-coupling/generator set 400A. Incidentally, the governing valve closure signal 19 indicates that the power load unbalance relay circuit 14 outputs the governing valve quick-closing/bypass valve quick-opening command signal 15, whereby the governing valve 5 is closed without fail.

Figure 8:
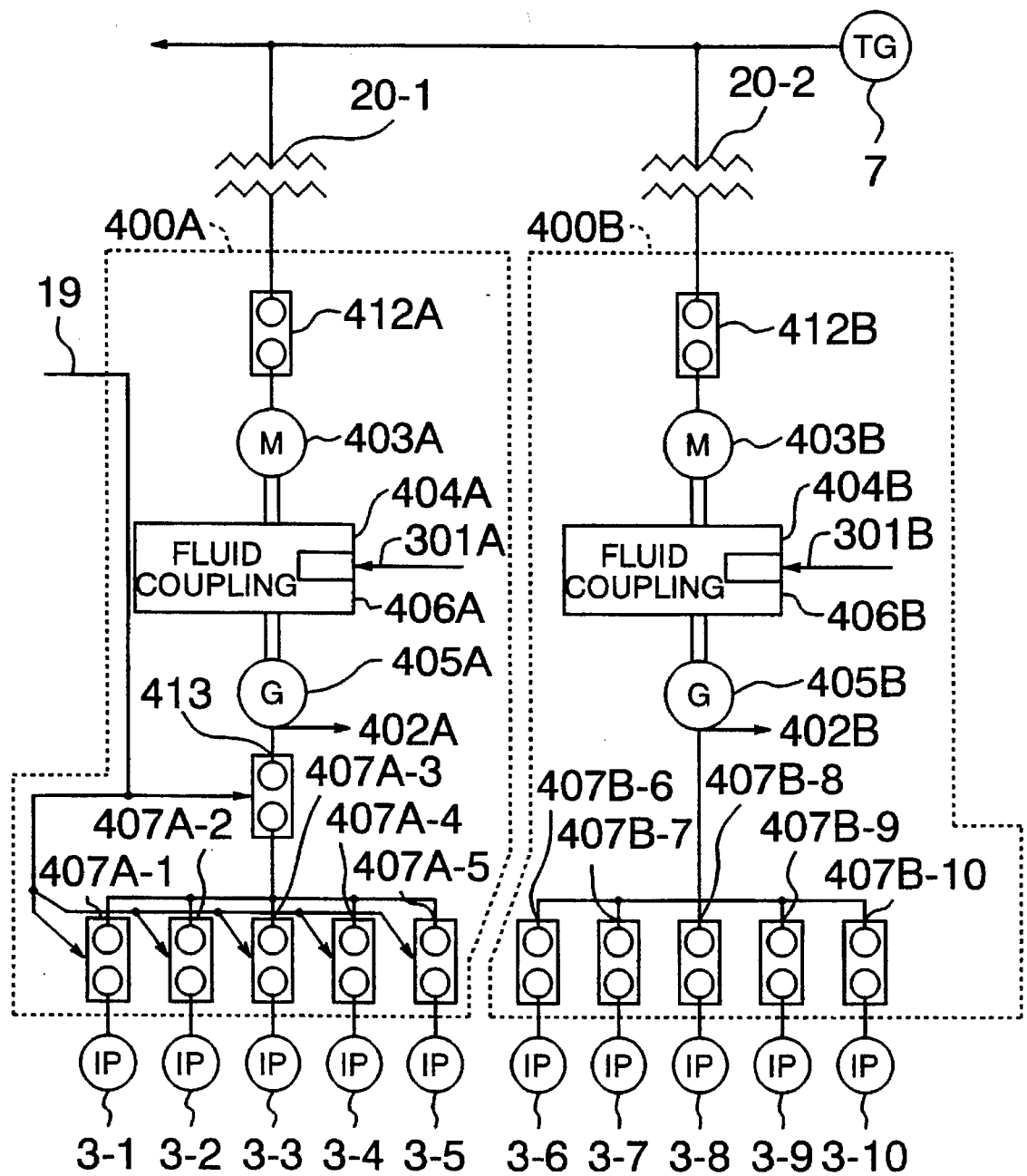
FIG. 8 is a block diagram showing an exemplary arrangement of an interlock mechanism operating upon load shutdown of a turbine-driven generator in a reactor core coolant flow rate control system for a BWR type nuclear power plant according to another embodiment of the invention.

FIG. 8 is a block diagram for illustrating in detail an application of the interlock mechanism according to the instant embodiment of the invention to the motor/fluid-coupling/generator system or set described hereinbefore by reference to FIG. 4.

In the motor/fluid-coupling/generator set 400A, an internal pump trip circuit breaker 413A is provided at the output side of the variable-frequency generator 405A of the motor/ fluid-coupling/generator set 400A. Furthermore, internal pump trip circuit breakers 407A-1 to 407A-5 are provided at the input side of the individual internal pumps, respectively, for the purpose of protection thereof.

When the governing valve closure signal 19 is generated upon disconnection of load of the turbine-driven generator 7 (FIG. 2), the governing valve closure signal 19 is inputted to the motor/fluid-coupling/ generator set 400A. In response to this governing valve closure signal 19, the internal pump trip circuit breaker 414A is opened. Further, the internal pump trip circuit breakers 407A-1 and 407A-5 provided for the protection are opened as well. As a result of this, the internal pumps 3-1 to 3-5 are tripped. By contrast, operations of the internal pumps 3-6 to 3-10 are continuously maintained by way of the motor/fluid-coupling/generator set 400B, whereby the reactor core coolant flow rate can be regulated (lowered) with the aid of these alive internal pumps 3-6 to 3-10.

By virtue of the interlock mechanism adopted in the reactor core coolant flow rate control system according to the instant embodiment of the invention in which the governing valve closure signal 19 is transmitted to the internal pump trip circuit breaker 413A as well as to the internal pump trip circuit breakers 407A-1 to 407A-5 for tripping the associated circuit breakers, control procedure can inexpensively realized with a much simplified arrangement as compared with the conventional system in which operation of the inverter units has to be stopped.

In the reactor core coolant flow rate control system according to the instant embodiment of the invention, the governing valve closure signal 19 is inputted to the motor/ fluid-coupling/generator set 400A. It should however be understood that the governing valve closure signal 19 may be inputted to the motor/fluid-coupling/generator set 400B, substantially to the same effect.

Furthermore, in the reactor core coolant flow rate control system according to the instant embodiment of the invention, the circuit breaker 413A is provided for tripping all the internal pump trip circuit breakers 407A-1 to 407A-5 and hence the internal pumps 3-1 to 3-5 concurrently. It should however be appreciated that the internal pumps 3-1 to 3-5 may be tripped only by the internal pump trip circuit breaker 413A or alternatively tripped by the internal pump trip circuit breakers 407A-1 to 407A-5 without resorting to the use of the circuit breaker 413A. Also in this case, the intended interlock control of the internal pumps can equally be realized.

Figure 9:
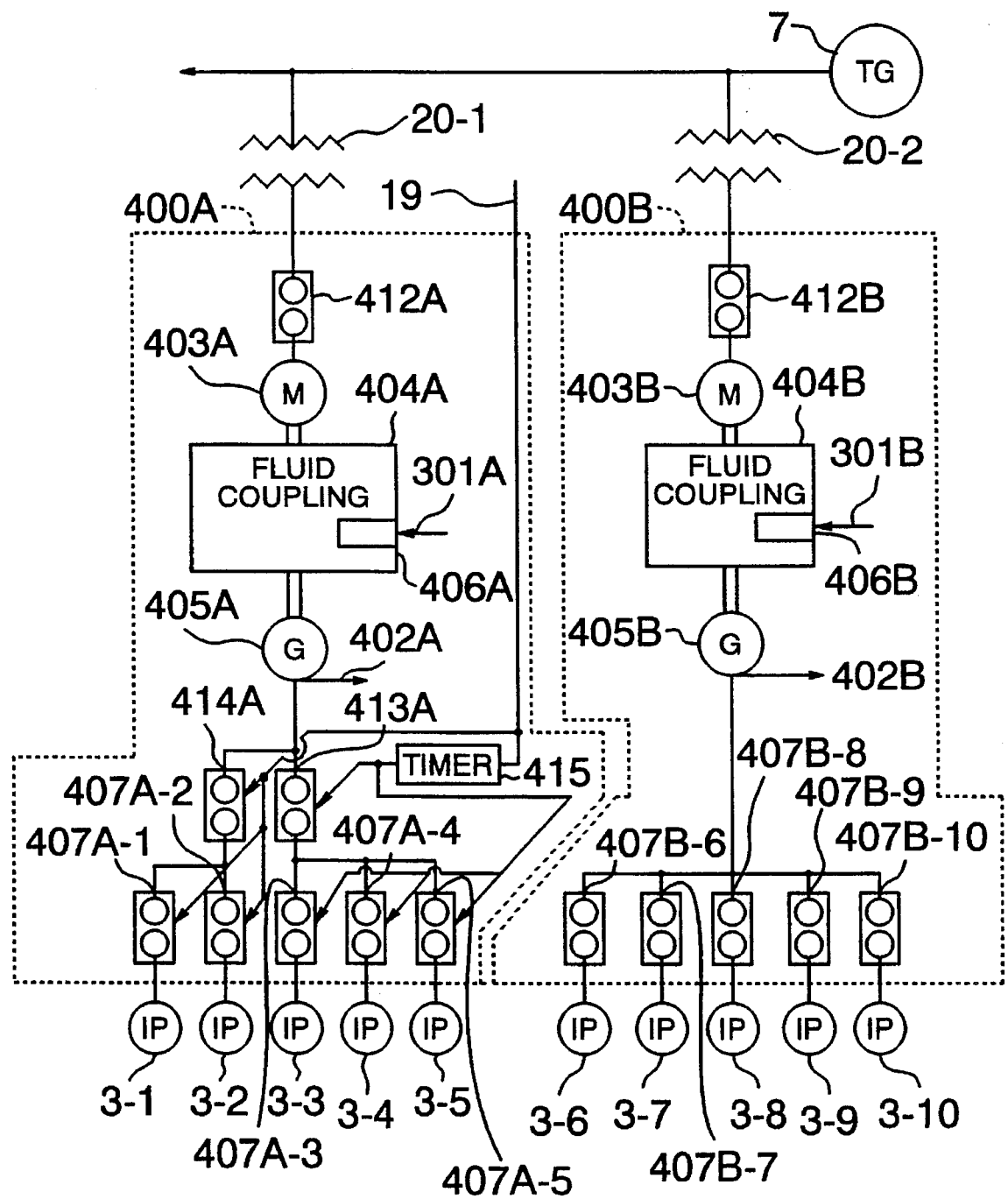
FIG. 9 is a view showing a modification of the interlock mechanism shown in FIG. 8.

FIG. 9 is a view showing a modification of the system described above by reference to FIG. 8.

In the case of the motor/fluid-coupling/generator set 400A in the modified system shown in FIG. 9, the output of the variable-frequency generator 405A of the motor/fluid-coupling/generator set 400A is branched into two circuit breaker systems such that the internal pumps 3-1 and 3-2 are connected to one of the circuit breaker systems with the internal pumps 3-3 to 3-5 being connected to the other circuit breaker system. An internal pump trip circuit breaker 414A is provided in association with the circuit breaker system to which the internal pumps 3-1 and 3-2 are connected, while an internal pump trip circuit breaker 413A is provided in association with the internal pumps 3-3 to 3-5 by way of a timer 415.

The governing valve closure signal 19 inputted to the motor/fluid-coupling/generator set 400A is branched into a pair of signal streams, one of which is inputted directly to the internal pump trip circuit breaker 414A and the internal pump trip circuit breakers 407A-1 and 407A-2 for opening them instantaneously, while the other signal resulting from the division of the governing valve closure signal 19 is inputted to the timer 415 to be subsequently supplied to the internal pump trip circuit breaker 413A and the internal pump trip circuit breakers 407A-3 to 407A-5 only after lapse of a predetermined time set in the timer 415 so that the internal pump trip circuit breaker 413A and the internal pump trip circuit breakers 407A-3 to 407A-5 are opened upon lapse of the predetermined time after interruption of the first mentioned circuit breaker system. This means that the internal pumps are tripped stepwise sequentially.

With the arrangement of the modified control system provided with the interlock mechanism as described above, the reactor core coolant flow rate can be prevented from decreasing rapidly and the internal pumps can be tripped, as occasions require.

In the case of the modified system mentioned above, the governing valve closure signal 19 is inputted to the motor/fluid-coupling/generator set 400A. It should however be noted that the governing valve closure signal 19 may alternatively be inputted to the motor/fluid-coupling/generator set 400B, substantially to the same effect.

Furthermore, in the case of the modified reactor core coolant flow rate control system, the internal pump trip circuit breakers 414A and 413A are provided for tripping concurrently the internal pumps 3-1 and 3-2 by means of the internal pump trip circuit breakers 414A and 407A-1 and 407A-2, while the internal pumps 3-3 to 3-5 are simultaneously tripped by the internal pump trip circuit breakers 413A and 407A-3 to 407A-5, it should be appreciated that such arrangement may equally be adopted in which the internal pumps 3-1 to 3-5 are tripped by means of the internal pump trip circuit breakers 414A and 413A or alternatively the internal pumps 3-1 to 3-5 are tripped by the internal pump trip circuit breakers 407A-1 to 407A-5 without providing the circuit breakers 414A and 413A, substantially to the same effect.

Next, again referring to FIG. 2, description will be made of another embodiment of the interlock mechanism for the reactor core coolant flow rate control system which is designed for tripping the internal pumps upon occurrence of abnormality in the BWR type nuclear reactor, e.g. when the reactor vessel pressure becomes higher than a prescribed value with a cooling water level within the nuclear reactor becoming lower than a predetermined level.

In the interlock mechanism according to the instant embodiment of the present invention, both a reactor pressure signal 17 and a reactor coolant level signal 18 are inputted to the motor/fluid-coupling/generator set 400A while the motor/fluid-coupling/generator set 400B is supplied with only the reactor coolant level signal 18.

Figure 10:
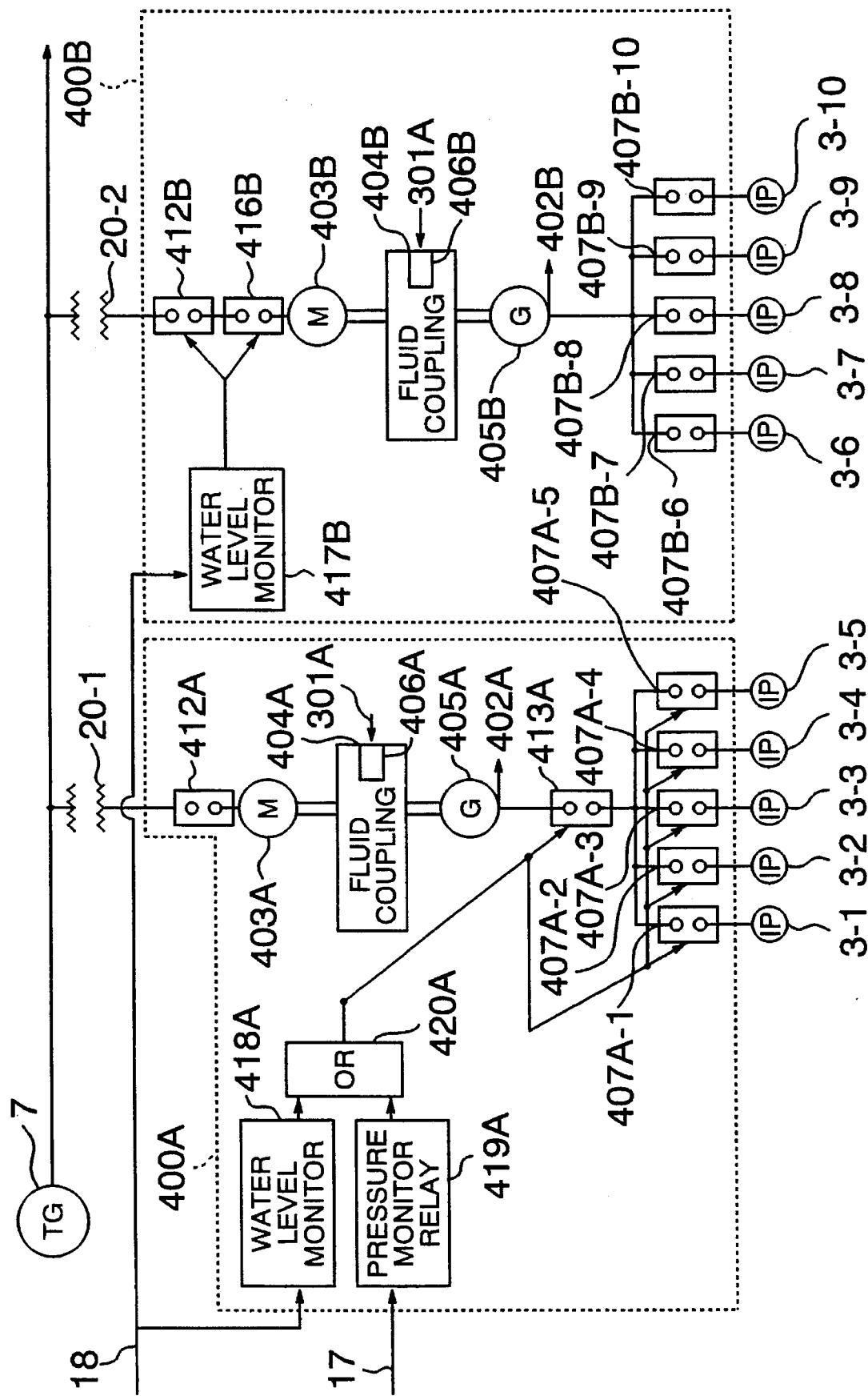
FIG. 10 is a block diagram showing an exemplary arrangement of an interlock mechanism operating upon occurrence of high reactor pressure or cooling water level lowering in a reactor core coolant flow rate control system for a BWR type nuclear power plant according to yet another embodiment of the invention.

FIG. 10 shows in detail a structure of the motor/fluid-coupling/generator set system described hereinbefore by reference to FIG. 4 to which the teaching of the invention incarnated in the instant embodiment is applied.

Referring to FIG. 10, in the motor/fluid-coupling/generator set 400A, an internal pump trip circuit breaker 413A is installed at the output side of the variable-frequency generator 405A. Furthermore, installed at the input side of the individual internal pumps 3-1 to 3-5 are internal pump trip circuit breakers 407A-1 to 407A-5, respectively, for the protection purpose, as described hereinbefore by reference to FIG. 3. On the other hand, in the motor/fluid-coupling/generator set 400B, a circuit breaker 416B is installed in addition to a circuit breaker 412B both at the input side of the AC driving motor 403B of the motor/fluid-coupling/generator set 400B. Furthermore, at the input side of the individual internal pumps, there are installed the internal pump trip circuit breakers 407B-6 to 407B-10, respectively, for the protection purpose, as described hereinbefore in conjunction with FIG. 3.

The motor/fluid-coupling/generator set 400A is provided with a pressure monitoring relay 419A to which the reactor pressure signal 17 is inputted, a water level monitoring relay 418A to which the reactor coolant level signal 18 is inputted, and an OR circuit 420A, while the motor/fluid-coupling/generator set 400B is provided with a water level monitoring relay 417B to which the reactor coolant level signal 18 is inputted.

In the case of the motor/fluid-coupling/generator set 400A, the reactor pressure signal 17 is inputted to the pressure monitoring relay 419A, as mentioned above. When the reactor pressure signal 17 increases beyond a prescribed value, a signal is outputted to the OR circuit 420A from the pressure monitoring relay 419A. On the other hand, the reactor coolant level signal 18 is inputted to the water level monitoring relay 418A. When the reactor coolant level signal 18 reaches a prescribed level $X_1$, a signal is outputted from the water level monitoring relay 418A to the OR circuit 420A. Thus, when at least one of the reactor pressure and the reactor coolant level has attained the relevant prescribed value, a signal is outputted from the OR circuit 420A to the internal pump trip circuit breaker 413A and 407A-1 to 407A-5 all of which are thus opened concurrently. On the other hand, in the motor/fluid-coupling/generator set 400B, the reactor coolant level signal 18 is inputted to the water level monitoring relay 417B. When the reactor coolant level signal 18 has attained a prescribed level $X_2$ (where $X_1 > X_2$), a signal is outputted from the water level monitoring relay 417B to the motor/fluid-coupling/generator set trip circuit breakers 412B and 416B, which are thus opened simultaneously.

Figures 11A, 11B:
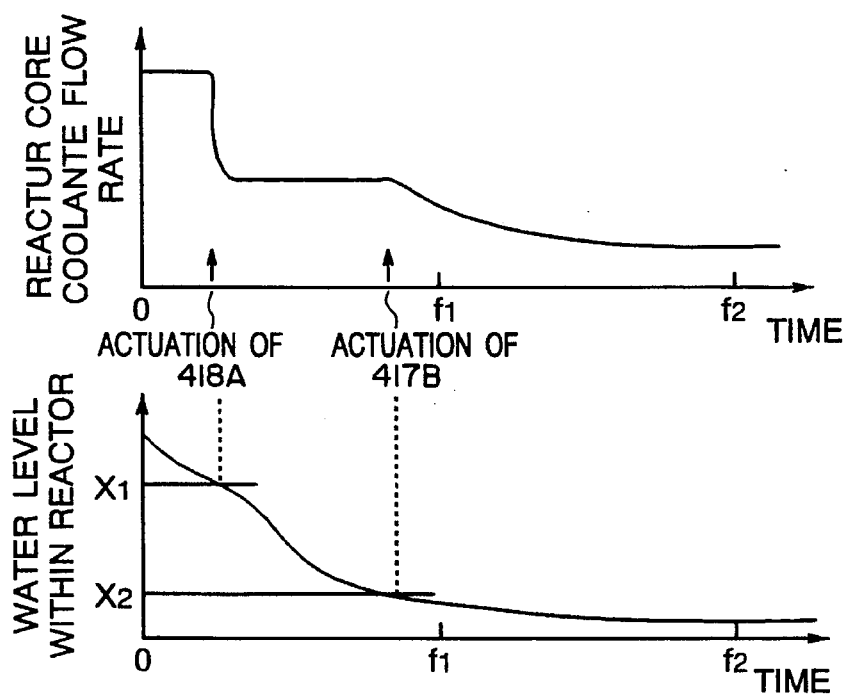
FIGS. 11a–11b are timing charts for illustrating graphically behaviors of cooling water level and reactor coolant flow rate for illustrating operation of the interlock mechanism shown in FIG. 10 upon occurrence of lowering of the cooling water level within the nuclear reactor.

The interlock mechanism whose operation is associated with the coolant or water level within the reactor will be elucidated by reference to FIGS. 11a–11 b. When the coolant or water level within the nuclear reactor falls to the prescribed level $X_1$, as shown in FIG. 11b, the water level monitoring relay 418A incorporated in the motor/fluid-coupling/generator set 400A is actuated to open concurrently all the internal pump trip circuit breakers 413A and 407A-1 to 407A-5 via the OR circuit 420A. Because the internal pump trip circuit breaker 413A as well as the internal pump trip circuit breakers 407A-1 to 407A-5 are disposed at the output side of the motor/fluid-coupling/generator set 400A, operations of the internal pumps 3-1 to 3-5 are instantaneously stopped, which results in rapid decreasing of the reactor core coolant flow rate. When the coolant level within the nuclear reactor falls further to reach the prescribed level $X_2$, the water level monitoring relay 417B incorporated in the motor/fluid-coupling/generator set 400B is operated to open simultaneously both the motor/generator set trip circuit breakers 412B and 416B. In that case, however, since the circuit breakers 412B and 416B are disposed at the input side of the motor/fluid-coupling/generator set 400B, the latter is maintained in the state capable of continuously driving the internal pumps 3-6 to 3-10 under the mechanical inertia of the motor/fluid-coupling/generator set 400B, as a result of which the reactor core coolant flow rate decreases only gently up to a time point $t_2$ in response to the actuation of the water level monitoring relay 417B.

Figure 12A:
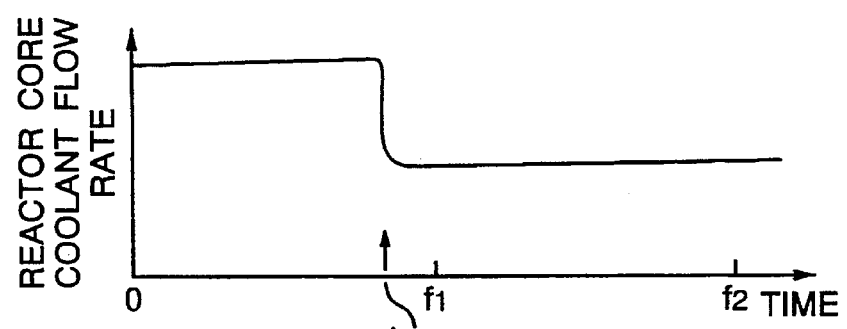
FIGS. 12a–12b are timing charts for illustrating graphically behaviors of reactor pressure and reactor coolant flow rate for illustrating operation of the interlock mechanism shown in FIG. 10 when the reactor pressure becomes high.
Figure 12B:
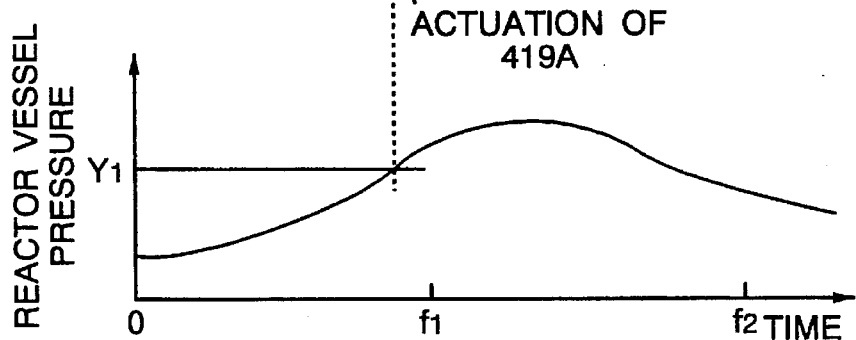

Next, description will turn to operation of the interlock mechanism in conjunction with the nuclear reactor pressure by reference to FIGS. 12a–12b. When the reactor pressure rises up to a prescribed value $Y_1$, as shown in FIG. 12b, the pressure monitoring relay 419A of the motor/fluid-coupling/ generator set 400A operates to open concurrently all the internal pump trip circuit breakers 413 and 407A-1 to 407A-5 via the OR circuit 420A. Consequently, the internal pumps 3-1 to 3-5 are instantaneously stopped, which results in rapid or steep decrease of the reactor core coolant flow rate, as shown in FIG. 12a. However, because the internal pumps 3-6 to 3-10 are continuously driven by the motor/ fluid-coupling/generator set 400B, the reactor core coolant flow rate can be maintained at a predetermined value.

Parenthetically, the reason why two circuit breakers 412B and 416B which are actuated in response to the signal supplied from the water level monitoring relay 417B is to implement the fail-safe feature, i.e., to interrupt the power supply to one of these circuit breakers even when the other should suffer from a fault. For the same reason, there are provided the internal pump trip circuit breakers 413A and 407A-1 to 407A-5 which operate in response to the output signal of the OR circuit 420A.

As will now be understood from the above description, owing to such arrangement that the circuit breakers installed at the input and output sides of the motor/fluid-coupling/ generator set are tripped in response to the reactor pressure signal 17 and the reactor coolant level signal 18, the system structure as well as operation can be much simplified and implemented inexpensively, when compared with the conventional system where the operation of the inverter units has to be stopped.

Of course, it goes without saying that the interlock structures implemented in the motor/fluid-coupling/generator set 400A and the motor/fluid-coupling/generator set 400B may be replaced by each other while ensuring the functions similar or equivalent to those described previously.

Further, the internal pump trip circuit breakers and the motor/fluid-coupling/generator set trip circuit breakers in the system according to the instant embodiment of the invention may be implemented in the structures similar to those described hereinbefore by reference to FIG. 8.

Moreover, it should be mentioned that the signals issued upon disconnection of the turbine-driven generator load and inputted to the internal pump trip circuit breakers shown in FIGS. 8 and 9 are independent of the signals which are inputted to the internal pump trip circuit breakers and the motor/fluid-coupling/generator set trip circuit breakers and which indicate high reactor pressure or low reactor coolant level, wherein the interlock operations based on these signals can be carried out without interfering with each other.

With a view to enhancing the pump speed controllability while suppressing the influence of the external power supply system to a possible minimum in the BWR type nuclear power plant, it is considered to be most preferable or optimal to provide ten internal pumps for recirculating the cooling water or coolant while employing two variable-frequency power supply sources (i.e., motor/fluid-coupling/generator sets) each composed of an AC motor, a fluid coupling and a variable-frequency generator which are mechanically connected to one another as the power supply equipment and the control apparatus for the internal pumps. In that case, the AC motor of the motor/fluid-coupling/generator set is supplied with an electric power from an external power supply source and adapted to rotate at a constant speed after the start to thereby transmit a torque to the variable-frequency generator. Connected to one variable-frequency generator are five internal pumps so that they are supplied with electric power from that one variable-frequency generator. The amount of the fluid or oil contained in the fluid coupling is adjustable. By adjusting or regulating the amount of oil of the fluid coupling, magnitude of the torque transmitted to the variable-frequency generator from the AC driving motor can correspondingly be controlled to thereby regulate the rotation speed of the variable-frequency generator and hence that of the internal pumps connected thereto. In this manner, the reactor core coolant flow rate within the reactor can be controlled.

With the reactor core coolant flow rate control arrangement mentioned above, activation or starting operation of the internal pumps connected to the variable-frequency generator is carried out by stating the operation of the AC driving motor in the state in which the scooping pipe is inserted by a possible maximum extent to a lowest position in order to minimize magnitude of the torque transmitted from the AC driving motor to the variable-frequency generator and by closing a field excitation circuit breaker for the variable-frequency generator at a sufficiently low speed (e.g. 10% of the rated speed) thereof. It is however only after the fluid coupling has reached a sufficiently high speed that the scooping pipe is capable of regulating or adjusting the amount of oil within the fluid coupling as a function of the position of the scooping pipe. In other words, in the state immediately after the start of rotation of the fluid coupling, the scooping function of the scooping pipe can not sufficiently be exhibited, which incurs such a result that the amount of oil is large relative to the position of the scooping pipe. As a consequence, a torque of greater magnitude than that equivalent to the scooping pipe position will be transmitted to the variable-frequency generator, whereby the latter is caused to start in a high-speed state.

On the other hand, when the control of the internal pumps is performed with the aid of the motor/fluid-coupling/generator set, a speed control system is implemented by using an automatic voltage regulator, wherein the control is heretofore so performed that the ratio (V/f) between the variable-frequency generator voltage (V) and the frequency (f) thereof is always to be constant. Parenthetically, the frequency f of the variable-frequency generator is used as an equivalent quantity to the speed thereof. Consequently, when the variable-frequency generator is started in the high-speed state, the generator voltage changes to a high voltage state proportionally to the change of the generator speed, which results in that the speed of the internal pumps controlled by the variable-frequency generator voltage rises steeply up to the speed of that generator substantially simultaneously with the start of the motor/fluid-coupling/ generator set.

Under the circumstances, the reactor core coolant flow rate in increases steeply as well, incurring an overshoot of neutron flux. In that case, the probability of generation of an alarm indicating a high neutron flux will become extremely high when taking into account errors in measurements as well as noise. Thus, neither adequate margin or tolerance against the scram operation due to the high neutron flux nor satisfactory internal pump starting characteristics can be ensured, giving rise to problems.

Thus, according to another aspect of the present invention, it is also contemplated to provide an internal pump starting system which is capable of suppressing occurrence of the overshoot of the neutron flux upon starting of the internal pumps while ensuring a sufficient margin against the scram due to the high neutron flux as well as the improved internal pump starting characteristics.

In view of the above-mentioned object, it is taught according to the invention that a voltage frequency (V/f) conversion constant of the automatic voltage regulator is changed between a starting mode and a normal operation mode of the internal pumps to thereby suppress the speed rise-up in the internal pump starting phase and decrease magnitude or range of change of the reactor core coolant flow rate in order to ensure a stable reactor operation by suppressing the high neutron flux increase or overshoot.

In the following, a system for starting the internal pumps as applied to a reactor core coolant flow rate control system according to an embodiment of the invention will be described.

Figure 13:
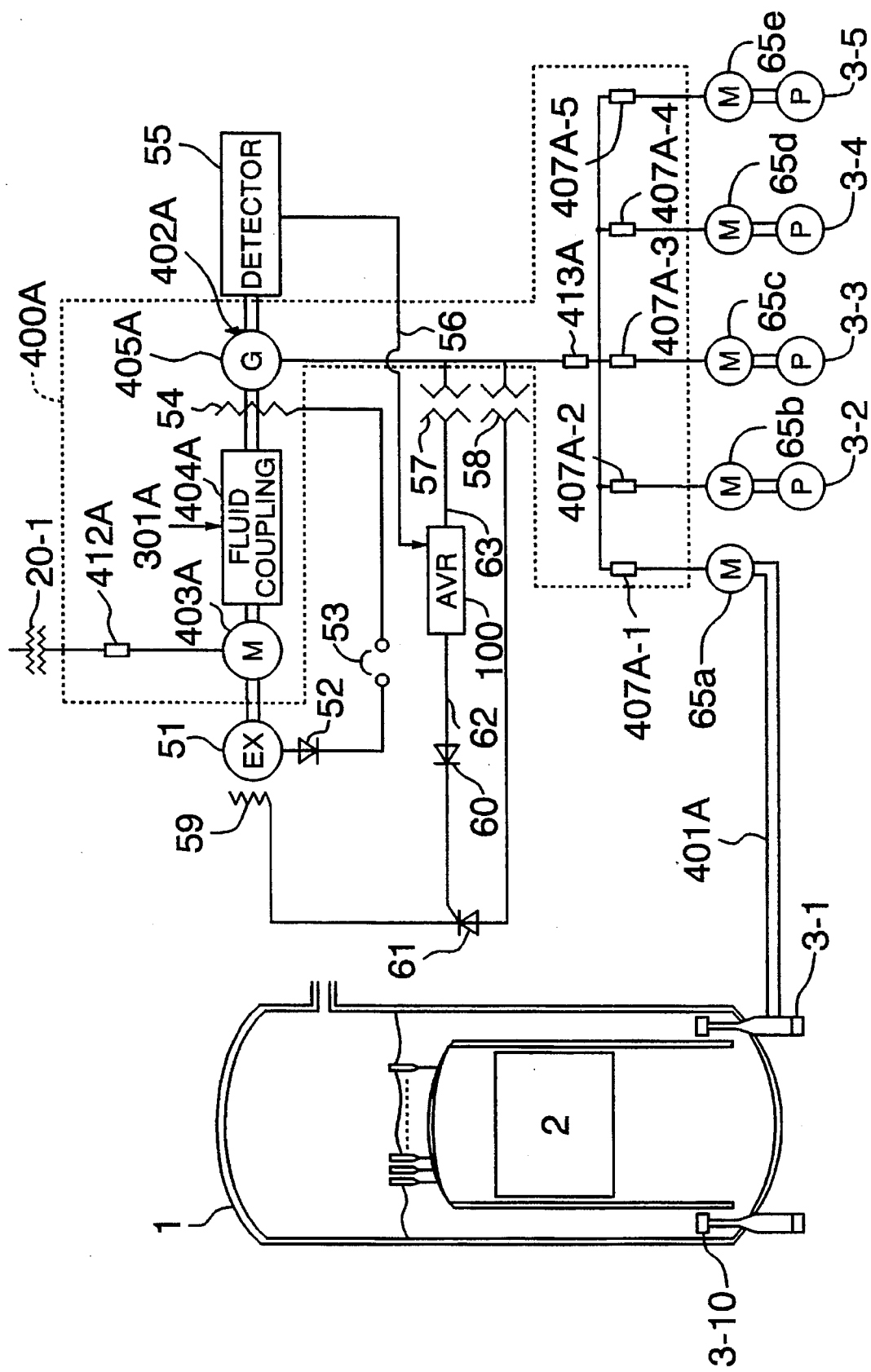
FIG. 13 is a diagram showing an arrangement of an internal pump starting system according to still another embodiment of the invention.

FIG. 13 is a diagram showing an arrangement of an internal pump starting system according to an embodiment of the invention which is adapted to be incorporated in the reactor core coolant flow rate system for the BWR type nuclear power plant shown in FIG. 2. For simplification of elucidation, the description which follows is directed to only the starting system for one (400A) of the motor/fluid-coupling/generator sets 400A and 400B, being of course understood that the structure and operation of the starting system for the motor/fluid-coupling/generator set 400B are essentially same as those of the system for the motor/fluid-coupling/generator set 400A. Now, referring to FIG. 13, a variable-frequency generator 405A has a field winding 54 which is connected to an AC exciter 51 via a field circuit beaker 53 and a rectifying diode 52. The output of the variable-frequency generator 405A is connected to pump driving motors 65a to 65e via an internal pump trip circuit breaker 413A and internal pump trip circuit breakers 407A-1 to 407A-5, wherein outputs of the pump driving motors 65a to 65e are mechanically coupled to the internal pumps 3-1 to 3-5, respectively. The speed of the internal pumps is controlled by controlling the electric power supplied to the pump driving motors 65a to 65e. The AC exciter 51 is directly coupled to an AC driving motor 403A and has a field winding 59 connected to the variable-frequency generator 405A via an exciting transformer 58 and a thyristor 61 for receiving a part of electric power generated by the variable-frequency generator 405A. An automatic voltage regulator (AVR) 100 is connected to the variable-frequency generator 405A by way of an instrument transformer 57 and to a detector 55 for detecting the rotation number of the variable-frequency generator 405A in terms of pulses. Inputted to the automatic voltage regulator 100 is a voltage signal 63 outputted from the instrument transformer 57 which serves for measuring the output voltage of the variable-frequency generator 405A and a frequency signal 56 outputted from the detector 55 which serves for detecting the rotation number of the variable-frequency generator 405A. The automatic voltage regulator 100 has an output terminal connected to a gate electrode of the thyristor 61 for applying to the gate of the thyristor 61 a pulse signal 62 at a firing angle selected for obtaining a predetermined generator voltage.

Figure 14:
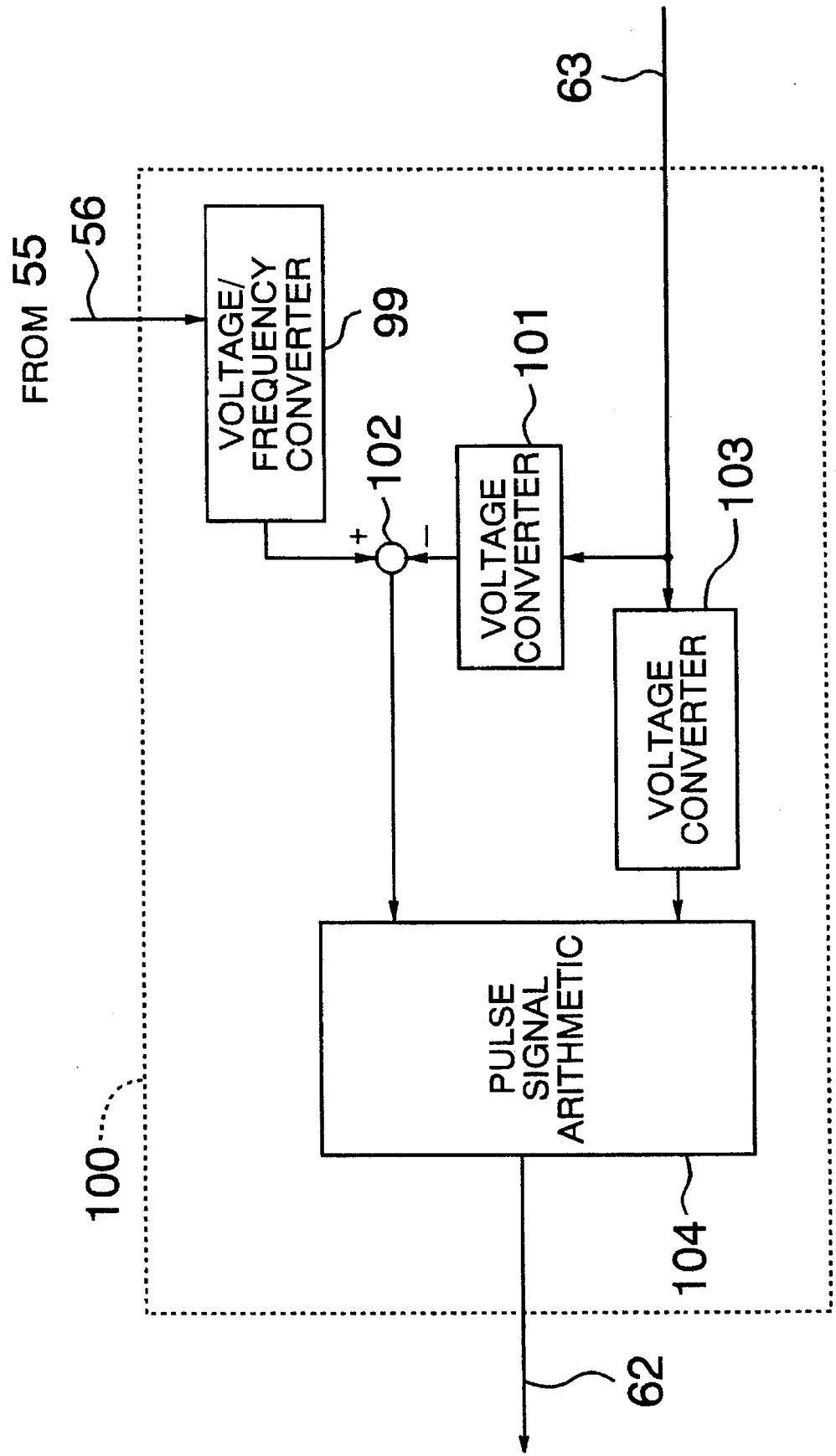
FIG. 14 is a circuit diagram showing an exemplary circuit configuration of an automatic voltage regulator employed in the starting system shown in FIG. 13.

FIG. 14 is a circuit diagram showing a circuit configuration of the automatic voltage regulator 100 in the starting system mentioned above. The automatic voltage regulator 100 is comprised of a voltage/frequency (V/f) converter 99, a voltage converter 101, an adder 102, a voltage converter 103 and a pulse signal arithmetic unit 104 interconnected in such a manner as shown in FIG. 14. The frequency signal 56 outputted from the detector 55 detecting the rotation number of the variable-frequency generator 405A (see FIG. 13) is converted into a voltage via the voltage/frequency (V/f) converter 99. On the other hand, the voltage signal 63 outputted from the instrument transformer 57 and indicating the output voltage of the variable-frequency generator 405A is inputted to the voltage converter 101, the output of which is added to the output of the voltage/frequency (V/f) converter 99 by means of the adder 102. The output signal of the adder 102 is supplied to the pulse signal arithmetic unit 104 together with the output signal of the voltage converter 103 to which the voltage signal 63 is supplied. On the basis of these signals, the pulse signal arithmetic unit 104 arithmetically determines an excitation current which is required for exciting the field winding 59 of the AC exciter 51 for regulating the output voltage of the variable-frequency generator 405A to thereby output a pulse signal 62 for firing the thyristor 61.

Figure 15:
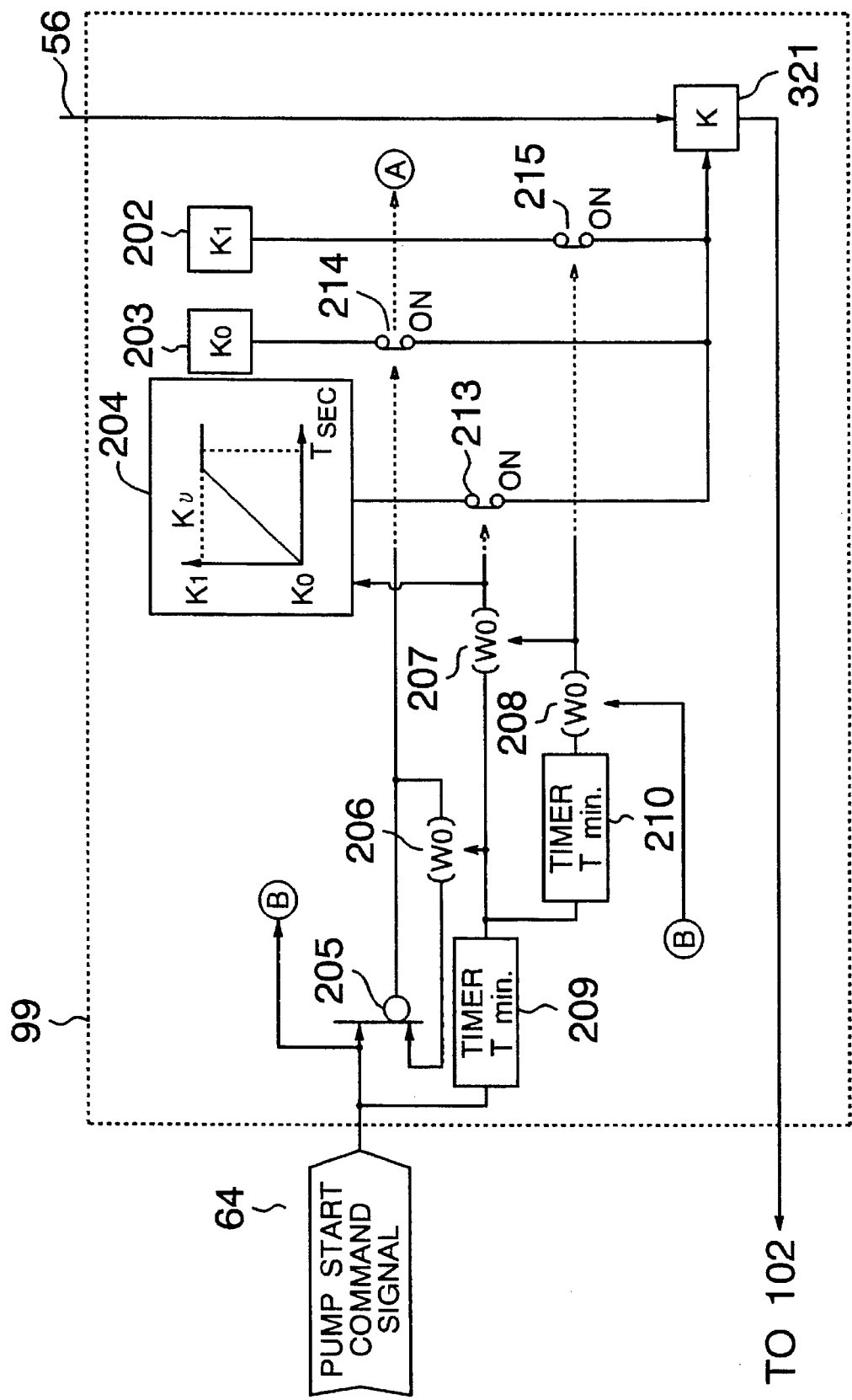
FIG. 15 is a block diagram showing an exemplary circuit configuration of a voltage/frequency (V/f) converter employed in the automatic voltage regulator shown in FIG. 14.

FIG. 15 is a block diagram showing in detail a circuit configuration of the voltage/frequency (V/f) converter 99 mentioned above. Referring to FIG. 15, the frequency signal 56 is multiplied by a V/f conversion constant K in a multiplier 321, the output of which is inputted to the adder 102. The V/f conversion constant K for the multiplication mentioned above is set at a proper value on the basis of a constant $K_1$ stored in a memory 202, a constant $K_0$ stored in a memory 203 and a variable $K_v$ stored in a memory (e.g. a map) 204 which can be changed over through associated switches 213, 214 and 215. More specifically, the constant $K_1$ represents a conversion constant selected such that a ratio between a rated frequency and a rated voltage of the variable-frequency generator 405A is "1:1" in a normal operation. On the other hand, the constant $K_0$ is so selected that a voltage change after the conversion is smaller relative to a change in the output frequency of the variable-frequency generator 405A in a starting phase. Finally, the variable $K_v$ varies as a function of time lapse T (sec.) from the constant $K_0$ in the starting phase to the constant $K_1$ in the normal operation state. The switches 213 to 215 are turned on/off in response to a pump start command signal 64 by means of a logic circuit composed of an OR circuit 205, timers 209 and 210 and wipe-out circuits 206, 207 and 208.

Next, description will turn to a method of driving the internal pumps 3-1 to 3-5 in the reactor core coolant flow rate control system to which the concept of the invention described above in conjunction with FIGS. 13 to 15 is applied.

Upon starting of the motor/field-coupling/generator set, the circuit breaker 412A of the AC driving motor 403A is closed in response to the pump start command signal 64. At the same time, the pump start command signal 64 is inputted to the voltage/frequency (V/f) converter 99 incorporated in the automatic voltage regulator 100.

Upon closing of the circuit breaker 412A, the AC driving motor 403A is started and will attain the rated rotation number after lapse of a predetermined time. The torque generated by the AC driving motor 403A is transmitted to the variable-frequency generator 405A via the fluid coupling 404A, whereby the variable-frequency generator 405A is started and driven in following up the rotation number of the AC driving motor 403A. When the rotation number of the variable-frequency generator 405A reaches a predetermined rotation number (a relatively low rotation number), the field circuit breaker 53 is closed to allow an excitation current to be supplied to the field winding 54 of the variable-frequency generator 405A from the AC exciter 51. The output power generated by the variable-frequency generator 405A is supplied to the pump driving motors 65a to 65e to thereby start the internal pumps 3-1 to 3-5, respectively.

Simultaneously, the voltage signal 63 indicating the output voltage of the variable-frequency generator 405A and the frequency signal 56 indicating the rotation number of the variable-frequency generator 405A are inputted to the automatic voltage regulator 100. Because the pump start command signal 64 is inputted to the voltage/frequency (V/f) converter 99 incorporated in the automatic voltage regulator 100, a logical sum condition for the OR circuit 205 is satisfied, whereby the switch 214 is turned on, while the switch 215 is turned off by the wipe-out circuit 208. Thus, as the V/f conversion constant K, the constant $K_0$ which makes smaller the voltage change relative to the frequency change in the starting mode or phase is validated. Thus, the ratio of magnitude of the voltage change to that of the frequency change in the starting mode is decreased by a certain value when compared with the corresponding ratio in the normal operation state. The frequency signal 56 is multiplied by this constant $K_0$ in the multiplier 321 to be converted into a voltage signal which is then inputted to the adder 102 which in turn adds this voltage signal to the output of the voltage converter 101 to which the voltage signal 63 is supplied. The pulse signal arithmetic unit 104 responds to the output of the adder 102 and the voltage outputted from the voltage converter 103 to thereby generate the pulse signal 62 of a small firing angle. Consequently, the excitation current flowing to the field winding 59 of the AC exciter 51 from the thyristor 61 is suppressed, which result in that the output voltage of the variable-frequency generator 405A is suppressed relative to the rotation number thereof. Thus, the internal pumps 3-1 to 3-5 rotate at a low speed.

In this manner, upon starting of the motor/fluid-coupling/ generator set, the output voltage of the variable-frequency generator 405A is suppressed to be low relative to the rotation number of the variable-frequency generator 405A, which results in low rotation speeds of the internal pumps 3-1 to 3-5. Thus, the problem of the conventional motor/ generator set (FIG. 1) that the rotation speed of the internal pump increases steeply up to the rotation speed of the AC generator substantially simultaneously with the start of the AC driving motor can satisfactorily be solved.

Next, let's assume that the rotation speed of the internal pumps 3-1 to 3-5 increases gently to a lowest pump speed (e.g. 20% of the rated speed) after lapse of the time T (sec.) from the start of the motor/fluid-coupling/generator set. In that case, a signal is issued from the timer 209. As a result of this, the switch 214 is opened by the wipe-out circuit 206 and at the same time the switch 213 is closed, as a result of which the variable $K_v$ is validated in place of the constant $K_0$ for the starting mode, wherein the value of the variable $K_v$ varies gently from the constant $K_0$ to the constant $K_1$ for the normal operation mode during the period T (sec.), as can be seen in FIG. 15 (block 204). When the variable $K_v$ assumes the value of the constant $K_1$ set for the normal operation after lapse of the time period T (sec.), a signal indicating this event is issued by the timer 210. Then, the switch 213 is opened by the wipe-out circuit 207 with the switch 215 being closed, as a result of which the constant $K_1$ is set as the V/f conversion constant K in place of the variable $K_v$.

In this way, by using the variable $K_v$ as the V/f conversion constant after the internal pumps 3-1 to 3-5 have reached the lowest pump speed such as mentioned previously, it is possible to change the ratio (V/f) of the voltage to the frequency gently and smoothly from the value for the stating operation to the value for the normal operation. Thus, the normal control can be started with the frequency of the variable frequency generator being protected against abrupt or stepwise change.

Figure 16A:
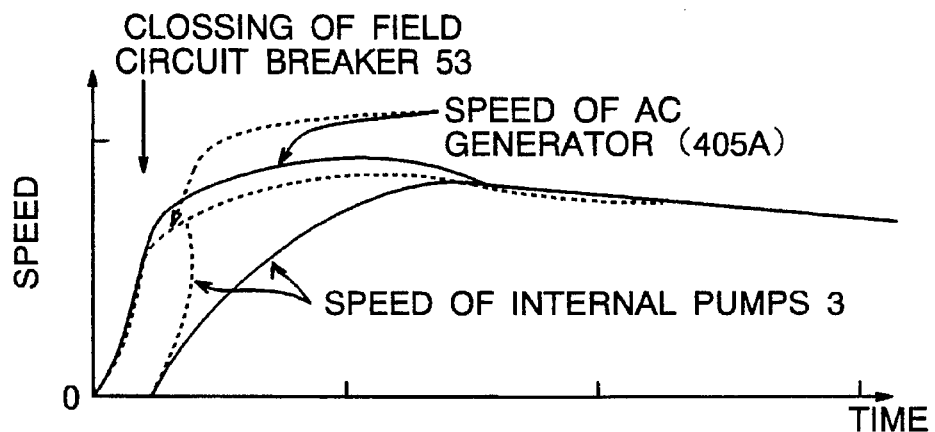
FIGS. 16a–16c illustrate in timing charts internal pump starting characteristics in the system according to the invention.
Figure 16B:
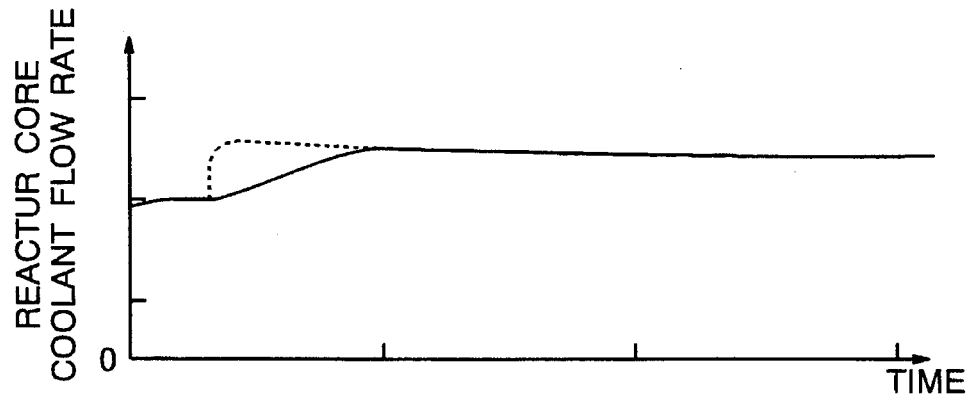
Figure 16C:
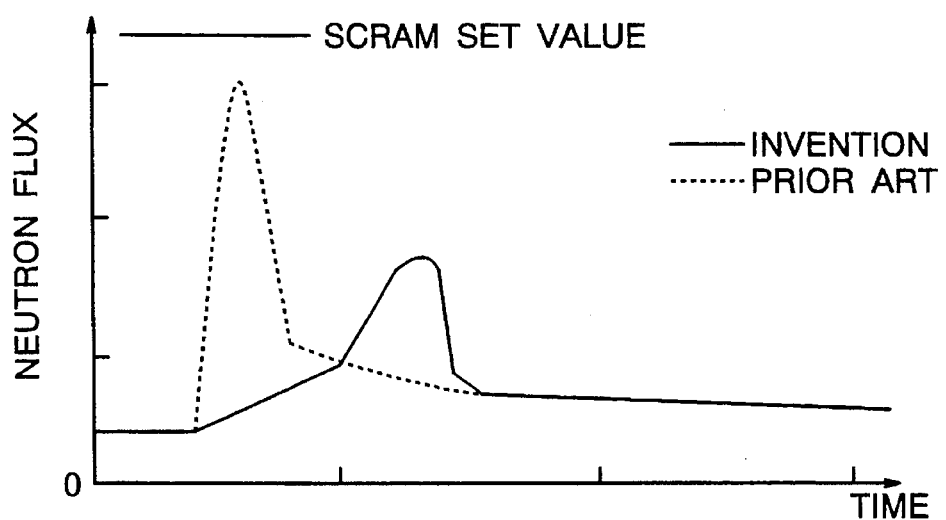

FIGS. 16a–16c show timing charts for illustrating internal pump starting characteristics or behaviors of the system to which the starting system according to the invention is applied, by comparing with those of the conventional system. In the figure, solid line curves represent behaviors of the inventive system with phantom line curves indicating those of the conventional system.

Referring to FIGS. 16a–16c, in the case of the conventional system, the speed of the internal pump rises up to the speed of the variable-frequency generator 405A immediately after the closure of the field circuit breaker 53, as indicated in FIG. 16a (see phantom line curve). As a result of this, the reactor core coolant flow rate increases steeply, as indicated in FIG. 16b with significant neutron flux overshoot taking place. Typically, the neutron flux will increase to a level of about 100% with the margin for the value set for the scram operation being possibly exceeded.

By contrast, in the system according to the invention, the constant $K_0$ making smaller the voltage change relative to the frequency change is set as the V/f conversion constant K in the voltage/frequency (V/f) converter 99 simultaneously with the closing of the circuit breaker 412A in the starting operation. Thus, when compared with the conventional system in which the constant $K_1$ set as the V/f conversion constant for the normal operation is set even in the starting operation, the frequency or speed of the internal pump increases gently, as indicated in FIG. 16a (see the solid line curve). As a result of this, the reactor core coolant flow rate increases gently, as shown in FIG. 16b. Simultaneously, a maximum value of the neutron flux has a sufficient margin to the value for activating the scram, as is shown in FIG. 16c.

FIG. 17 shows a circuit configuration of a modified voltage/frequency (V/f) converter 99M according to yet another embodiment of the invention. Referring to FIG. 17, the voltage/frequency (V/f) converter 99M is comprised of a memory 216 for storing constantly the value of the V/f conversion constant K, an adder 225, a monitor 217 supplied with a deviation or difference signal from the adder 225 to thereby turn on/off switches 221 and 222 and a change rate limiter 218 supplied with the V/f conversion constant $K_1$ for the normal operation from a memory 202 to thereby change only gently the value of the V/f conversion constant K of the multiplier 321M to the constant $K_1$ for the normal operation. The frequency signal 56 is multiplied by the V/f conversion constant K in the multiplier 321M, the output of which is supplied to the adder 102. The V/f conversion constant K can selectively be set to the constant $K_0$ or $K_1$ by closing/ opening the switches 223 to 224 which are controlled through an OR circuit 219 to which the pump start command signal 64 and a pump speed-up end signal 70 are inputted.

Next, description will turn to a method of driving the internal pumps 3-1 to 3-5 in the reactor core coolant flow rate control system to which the concept of the invention described above in conjunction with FIGS. 13, 14 and 17 is applied.

Upon starting of the motor/field-coupling/generator set, the circuit breaker 412A of the AC driving motor 403A is closed in response to the pump start command signal 64. At the same time, the pump start command signal 64 is inputted to the voltage/frequency (V/f) converter 99M incorporated in the automatic voltage regulator 100.

Upon closing of the circuit breaker 412A, the AC driving motor 403A is started and attains the rated rotation number after lapse of a predetermined time. The torque generated by the AC driving motor 403A is transmitted to the variable-frequency generator 405A via the fluid coupling 404A, whereby the variable-frequency generator 405A is started and driven in following up the rotation number of the AC driving motor 403A. When the rotation number of the variable-frequency generator 405A reaches a predetermined rotation number (a relatively low rotation number), the field circuit breaker 53 is closed to allow an excitation current to be supplied to the field winding 54 of the variable-frequency generator 405A from the AC exciter 51. The output power generated by the variable-frequency generator 405A is supplied to the pump driving motors 65a to 65e to thereby start the internal pumps 3-1 to 3-5, respectively.

Simultaneously, the voltage signal 63 indicating the output voltage of the variable-frequency generator 405A and the frequency signal 56 indicating the rotation number of the variable-frequency generator 405A are inputted to the automatic voltage regulator 100. Because the pump start command signal 64 is inputted to the voltage/frequency (V/f) converter 99M incorporated in the automatic voltage regulator 100, a logical sum condition for the OR circuit 219 is satisfied, whereby the switch 223 is turned on, while the switch 224 is turned off. Thus, as the V/f conversion constant K, the constant $K_0$ which makes smaller the voltage change relative to the frequency change in the starting mode or phase is validated. Thus, the ratio of magnitude of the voltage change to that of the frequency change in the starting mode is decreased by a certain value when compared with the corresponding ratio in the normal operation state. The frequency signal 56 is multiplied by this constant $K_0$ in the multiplier 321M to be converted into a voltage signal which is then inputted to the adder 102 which in turn adds this voltage signal to the output of the voltage converter 101 to which the voltage signal 63 is supplied. The pulse signal arithmetic unit 104 responds to the output of the adder 102 and the voltage outputted from the voltage converter 103 to thereby generate the pulse signal 62 of a small firing angle. Consequently, the excitation current flowing to the field winding 59 of the AC exciter 51 from the thyristor 61 is suppressed, which result in that the output voltage of the variable-frequency generator 405A is suppressed relative to the rotation number thereof. Thus, the internal pumps 3-1 to 3-5 rotate at a low speed.

Next, let's assume that the rotation speed of the internal pumps 3-1 to 3-5 increases gently to a lowest pump speed (e.g. 20% of the rated speed). In that case, a pump speed-up end signal is inputted to the voltage/frequency (v/f) converter 99M of the automatic voltage regulator 100. As a result of this, the switch 223 is opened by the wipe-out circuit 220. Simultaneously, the switch 224 is closed, whereby the V/f conversion constant $K_1$ for the normal operation is set in place of the constant $K_0$ for the starting operation.

On the other hand, the value of the V/f conversion constant K is constantly stored in the memory 216 provided at the output side of the multiplier 321M, wherein deviation or difference between the stored value mentioned above and the constant $K_1$ for the normal operation is arithmetically determined by the adder 225, the deviation thus determined being then inputted to the monitor 217 which is adapted to output a signal when the deviation mentioned above becomes zero.

The switch 224 is closed in response to the pump speed-up end signal 70. At this time point, the value of the V/f conversion constant K stored in the multiplier 321M is the constant $K_0$ for the starting operation. Consequently, devia-tion from the constant $K_1$ is large. Thus, the signal A is not outputted from the monitor 217. As a result, the switch 221 is in the opened state with the switch 222 being closed.

Inputting of the conversion constant $K_1$ for the normal operation to the multiplier 321M is performed by way of a change rate limiter 218. Consequently, the value of the V/f conversion constant changes only gently to the value of the constant $K_1$ for the normal operation, whereupon the input signal to the monitor 217 becomes zero, which results in issuance of the signal A from the monitor 217. As a result of this, the switch 222 is opened with the switch 221 being closed.

In this way, by changing over the V/f conversion constant from the value $K_0$ for the starting operation to the value $K_1$ for the normal operation by way of the change rate limiter 218 after the internal pumps 3-1 to 3-5 have reached the lowest pump speed such as mentioned previously, i.e., upon completion of the pump speed-up operation, it is possible to change the ratio (V/f) of the voltage to the frequency gently and smoothly from the value for the stating operation to the value for the normal operation. Thus, the normal control can be started while protecting the frequency of the variable-frequency generator against abrupt or stepwise change. It goes without saying that the system according to the instant embodiment of the invention can enjoy advantageous effects similar to those elucidated above by reference to FIGS. 16a–16c.

As is apparent from the foregoing description, the motor/fluid-coupling/generator set (i.e., set of the pump driving motor and the variable-frequency generator operatively interconnected by means of the fluid-coupling) which exhibits high mechanical inertia is employed as the variable-frequency power supply according to the basic concept of the present invention. Thus, it is possible not only to vary the power source frequency for the internal pump but also to maintain a power supply to the internal pump for a predetermined time period owing to the mechanical inertia of the motor/fluid-coupling/generator set notwithstanding of disturbance of the power supply due to a fault in the electric power transmission system, whereby the function for cooling the reactor core of the BWR type nuclear reactor as demanded can be ensured. Besides, owing to the feature mentioned above, the generator output power can be protected against dropping upon occurrence of a momentary service interruption. Additionally, even when a long-term service interruption takes place, decreasing in the reactor core coolant flow rate can be mitigated while suppressing the transitional boiling of the reactor fuel and ensuring the soundness or stability thereof.

Further, owing to the use of the motor/fluid-coupling/generator set exhibiting a high mechanical inertia as the variable-frequency power supply source, operation of the variable-frequency generator is protected against stoppage, whereby the abrupt operation stoppage of all the internal pumps can positively be excluded even upon occurrence of a long-term service interruption, whereby the thermal soundness of the reactor fuel can be ensured.

Moreover, the interlock mechanism for tripping the internal pumps upon disconnection or shutdown of load of the turbine-driven generator which is accompanied with increasing of the reactor vessel pressure and lowering of the coolant level within the reactor can be much simplified in respect to the structure, control and operation thereof according to the teachings of the present invention. This in turn means that the motor/fluid-coupling/generator set or system according to the invention can be implemented inexpensively in a much simplified structure and arrangement when compared with the inverter system adopted heretofore in conjunction with the driving of the internal pumps.

It should further be mentioned that by changing over the voltage/frequency (V/f) conversion constant in the automatic voltage regulator between the starting operation and the normal operation of the internal pump according to the teaching of the invention, the neutron flux overshoot in the internal pump starting phase can effectively be suppressed, whereby stable operation of the nuclear reactor can be ensured.

Many features and advantages of the present invention are apparent form the detailed description and thus it is intended by the appended claims to cover all such features and advantages of the system which fall within the true spirit and scope of the invention. Further, since numerous modifications and combinations will readily occur to those skilled in the art, it is not intended to limit the invention to the exact construction and operation illustrated and described. By way of example, the internal pumps shown in FIGS. 1, 2, 4, 8, 9 and 10 are constituted by motor-driven pumps as in the case of the system shown in FIG. 13, although these pump driving motors are omitted from illustration.

Accordingly, all suitable modifications and equivalents may be resorted to, falling within the spirit and scope of the invention.

We claim:

1. A reactor core coolant flow rate control system for a boiling water reactor type nuclear power plant in which electric power is generated by a turbine-driven generator driven by a steam turbine rotating under the work of a main steam generated from a cooling water recirculated through a boiling water reactor, comprising:

internal pump driving means comprised of an electric motor driven by utilizing an electric power generated by said turbine-driven generator, a fluid coupling for transmitting an output torque of said electric motor, and a variable-frequency generator whose rotation number is changed in accordance with the torque transmitted by way of said fluid coupling;

a plurality of internal pumps for recirculating said cooling water, said internal pumps being electrically connected in parallel to said variable-frequency generator of said internal pump driving means and driven by an electric output power of said variable-frequency generator supplied to said internal pumps in parallel, and said internal pumps having a rotation number which changes in dependence on the rotation number of said variable-frequency generator.

2. A reactor core coolant flow rate control system according to claim 1, wherein said internal pumps are disposed internally of a reactor pressure vessel of the boiling water reactor.

3. A reactor core coolant flow rate control system for a boiling water reactor type nuclear power plant in which electric power is generated by a turbine-driven generator driven by a steam turbine rotating under the work of a main steam generated from a cooling water recirculated through a boiling water reactor, comprising:

internal pump driving means comprised of an electric motor driven by using an electric power generated by said turbine-driven generator, a fluid coupling for transmitting an output torque of said electric motor, and a variable-frequency generator whose rotation number is changed in accordance with the torque transmitted by way of said fluid coupling; and fluid coupling control signal generating means for generating a fluid coupling control signal for said fluid coupling in response to at least one of deviation in a load and a rotation speed of said turbine-driven generator and deviation in a rotation speed of internal pumps; and a plurality of internal pumps for recirculating said cooling water, said internal pumps being electrically connected in parallel to said variable-frequency generator of said internal pump driving means and driven by an electric output power of said variable-frequency generator supplied to said internal pumps in parallel, and said internal pumps having a rotation number which changes in dependence on the rotation number of said variable-frequency generator;

wherein said fluid coupling changes a transmission efficiency for the torque transmitted to said variable-frequency generator from said electric motor in response to said fluid coupling control signal.

4. A reactor core coolant flow rate control system according to claim 3, said fluid coupling including a scooping pipe;
   said fluid coupling control signal being utilized for controlling a position of said scooping pipe;
   wherein said fluid coupling controls the position of said scooping pipe in response to said fluid coupling control signal to thereby change correspondingly the torque transmitted to said variable-frequency generator from said electric motor of said internal pump driving means.

5. A reactor core coolant flow rate control system according to claims 3, further comprising:

a plurality of internal pump trip circuit breakers disposed, respectively, between said plurality of internal pumps and said internal pump driving means for controlling supply of output power of said internal pump driving means to said plurality of internal pumps, respectively; and an internal pump driving means trip circuit breaker disposed at an input side of said internal pump driving means for controlling supply of output power of said turbine-driven generator to said internal pump driving means.

6. A reactor core coolant flow rate control system according to claim 5, further comprising:

load shutdown detecting means for detecting shutdown of a load of said turbine-driven generator to thereby output a load shutdown indicating signal to said plurality of internal pump trip circuit breakers;

wherein said plurality of internal pump trip circuit breakers are opened in response to said load shutdown indicating signal to thereby interrupt the power supply from said internal pump driving means to said plurality of internal pumps.

7. A reactor core coolant flow rate control system according to claim 5, further comprising:

load shutdown detecting means for detecting shutdown of a load of said turbine-driven generator to thereby output a load shutdown indicating signal to at least one of said plural internal pump trip circuit breakers;

delay means for supplying said load shutdown indicating signal to the other internal pump trip circuit breakers than said at least one circuit breaker with a predetermined time delay;

wherein said at least one of said plural internal pump trip circuit breakers is opened in response to said load shutdown indicating signal supplied from said load shutdown detecting means to thereby interrupt the power supply from said internal pump driving means to one of said plural internal pumps which is associated with said at least one of said plural internal pump trip circuit breakers;

wherein said other internal pump trip circuit breakers are opened in response to said load shutdown indicating signal supplied by way of said delay means to thereby interrupt the power supply to those of said plural internal pump trip circuit breakers provided, respectively, in association with said other internal pumps;

whereby said internal pumps are stopped stepwise in response to said load shutdown indicating signal supplied from said load shutdown detecting means.

8. A reactor core coolant flow rate control system according to claim 5, further comprising:

water level detecting means for detecting a water level of said cooling water within said nuclear reactor to thereby generate a water level indication signal when said water level lowers to a predetermined level;

wherein said plurality of internal pump trip circuit breakers are opened in response to said water level indication signal to thereby interrupt the power supply to said plurality of internal pumps from said internal pump driving means.

9. A reactor core coolant flow rate control system according to claim 5, further comprising:

pressure detecting means for detecting a pressure of said main steam within said nuclear reactor to thereby generate a pressure indication signal when said pressure is higher than a predetermined level inclusive thereof;

wherein said plurality of internal pump trip circuit breakers are opened in response to said pressure indication signal to thereby interrupt the power supply to said plurality of internal pumps from said internal pump driving means.

10. A reactor core coolant flow rate control system according to claim 5, further comprising:

load shutdown detecting means for detecting a turbine trip of said turbine-driven generator to thereby output a turbine trip indicating signal to said plurality of internal pump trip circuit breakers;

wherein said plurality of internal pump trip circuit breakers are opened in response to said turbine trip indicating signal to thereby interrupt the power supply from said internal pump driving means to said plurality of internal pumps.

11. A reactor core coolant flow rate control system according to claim 5, further comprising:

load shutdown detecting means for detecting a turbine trip of said turbine-driven generator to thereby output a turbine trip indicating signal to at least one of said plural internal pump trip circuit breakers;

delay means for supplying said turbine trip indicating signal to the other internal pump trip circuit breakers than said at least one circuit breaker with a predetermined time delay;

wherein said at least one of said plural internal pump trip circuit breakers is opened in response to said turbine trip indicating signal supplied from said turbine trip detecting means to thereby interrupt the power supply from said internal pump driving means to one of said plural internal pumps which is associated with said at least one of said plural internal pump trip circuit breakers;

wherein said other internal pump trip circuit breakers are opened in response to said turbine trip indicating signal supplied by way of said delay means to thereby interrupt the power supply to those of said plural internal pump trip circuit breakers provided, respectively, in association with said other internal pumps;

whereby said internal pumps are stopped step wise in response to said turbine trip indicating signal supplied from said turbine trip detecting means.

12. A reactor core coolant flow rate control system according to claim 8, further comprising:

said water level detecting means for outputting said water level indication signal to at least one of said plural internal pump trip circuit breakers; and delay means for supplying said water level indication signal to the other internal pump trip circuit breakers than said at least one circuit breaker with a predetermined time delay;

wherein said at least one of said plural internal pump trip circuit breakers is opened in response to said water level indication signal supplied from said water level detecting means to thereby interrupt the power supply from said internal pump driving means to one of said plural internal pumps which is associated with said at least one of said plural internal pump trip circuit breakers;

wherein said other internal pump trip circuit breakers are opened in response to said water level indication signal supplied by way of said delay means to thereby interrupt the power supply to those of said plural internal pump trip circuit breakers provided, respectively, in association with said other internal pumps;

whereby said internal pumps are stopped step wise in response to said water level indication signal supplied from said water level detecting means.

13. A reactor core coolant flow rate control system according to claim 9, further comprising:

said pressure detecting means for outputting said pressure indication signal to at least one of said plural internal pump trip circuit breakers; and delay means for supplying said pressure indication signal to the other internal pump trip circuit breakers than said at least one circuit breaker with a predetermined time delay;

wherein said at least one of said plural internal pump trip circuit breakers is opened in response to said pressure indication signal supplied from said pressure detecting means to thereby interrupt the power supply from said internal pump driving means to one of said plural internal pumps which is associated with said at least one of said plural internal pump trip circuit breakers;

wherein said other internal pump trip circuit breakers are opened in response to said pressure indication signal supplied by way of said delay means to thereby interrupt the power supply to those of said plural internal pump trip circuit breakers provided, respectively, in association with said other internal pumps;

whereby said internal pumps are stopped step wise in response to said pressure indication signal supplied from said pressure detecting means.

14. A reactor core coolant flow rate control system for a boiling water reactor type nuclear power plant in which electric power is generated by a turbine-driven generator driven by a steam turbine rotated under the work of a main steam generated from a cooling water recirculated through a boiling water reactor, comprising:

first and second internal pump driving means comprised, respectively, of first and second electric motors driven by utilizing an electric power generated by said turbine-driven generator, first and second fluid couplings for transmitting output torques of said first and second electric motors, and first and second variable-frequency generators whose rotation numbers are changed in accordance with the torques transmitted by way of said first and second fluid couplings, respectively;

fluid coupling control signal generating means for generating a fluid coupling control signal for said first and second fluid couplings in response to at least one of deviation in a load and a rotation speed of said turbine-driven generator and deviation in a rotation speed of internal pumps;

a plurality of first internal pumps for recirculating said cooling water, said first internal pumps being electrically connected in parallel to said first variable-frequency generator of said first internal pump driving means and driven by an electric output power of said first variable-frequency generator supplied to said first internal pumps in parallel, and said first internal pumps having a rotation number which changes in dependence on the rotation number of said first variable-frequency generator; and a plurality of second internal pumps for recirculating said cooling water, said second internal pumps being electrically connected in parallel to said second variable-frequency generator of said second internal pump driving means and driven by an electric output power of said second variable-frequency generator supplied to said second internal pumps in parallel, and said second internal pumps having a rotation number which changes in dependence on the rotation number of said second variable-frequency generator;

wherein said first and second fluid couplings of said first and second internal pump driving means change transmission efficiency for the torques transmitted to said first and second variable-frequency generators from said first and second electric motors, respectively, in response to said fluid coupling control signal.

15. A reactor core coolant flow rate control system according to claim 14, said first internal pump driving means further including:

a plurality of first internal pump trip circuit breakers disposed, respectively, between said plurality of first internal pumps and said first internal pump driving means for controlling supply of output power of said first internal pump driving means to said plurality of first internal pumps driving means, respectively; and a first internal pump driving means trip circuit breaker disposed at an input side of said first internal pump driving means for controlling supply of output power of said turbine-driven generator to said first internal pump driving means, said second internal pump driving means further including:

a plurality of second internal pump trip circuit breakers disposed, respectively, between said plurality of second internal pumps and said second internal pump driving means for controlling supply of output power of said second internal pump driving means to said plurality of second internal pumps driving means, respectively; and a second internal pump driving means trip circuit breaker disposed at an input side of said second internal pump driving means for controlling supply of output power of said turbine-driven generator to said second internal pump driving means.

16. A reactor core coolant flow rate control system according to claim 15, further comprising:

first water level detecting means for detecting a water level of said cooling water within said nuclear reactor to thereby generate a first water level indication signal when said water level lowers to a first predetermined level; and second water level detecting means for detecting a water level of said cooling water within said nuclear reactor to thereby generate a second water level indication signal when said water level lowers to a second predetermined level which is lower than said first water level;

wherein said plurality of first internal pump trip circuit breakers are opened in response to said first water level indication signal to thereby interrupt the power supply from said first internal pump driving means to said plurality of first internal pump provided in correspondence to said plurality of first internal pump trip circuit breakers, respectively; and wherein said second internal pump driving means trip circuit breaker is opened in response to said second water level indication signal to thereby interrupt the power supply from said turbine-driven generator to said second internal pump driving means.

17. A reactor core coolant flow rate control system according to claim 15, further comprising:

pressure detecting means for detecting a pressure of said main steam within said nuclear reactor to thereby generate a pressure indication signal when said pressure is greater than a predetermined level inclusive thereof;

wherein said plurality of first internal pump trip circuit breakers are opened in response to said pressure indication signal to thereby interrupt the power supply from said first internal pump driving means to said plurality of internal pumps provided in correspondence to said plurality of first internal pump circuit breakers, respectively.

18. A reactor core coolant flow rate control system according to claim 15, further comprising:

first water level detecting means for detecting a water level of said cooling water within said nuclear reactor to thereby generate a first water level indication signal when said water level lowers to a first predetermined level;

second water level detecting means for detecting a water level of said cooling water within said nuclear reactor to thereby generate a second water level indication signal when said water level lowers to a second predetermined level which is lower than said first water level; and pressure detecting means for detecting a pressure of said main steam within said nuclear reactor to thereby generate a pressure indication signal when said pressure is higher than a predetermined level inclusive thereof;

wherein said plurality of first internal pump trip circuit breakers are opened in response to one of said first water level indication signal and said pressure indication signal to thereby interrupt the power supply from said first internal pump driving means to said plurality of first internal pump provided in correspondence to said plurality of first internal pump trip circuit breakers, respectively; and wherein said second internal pump driving means trip circuit breaker is opened in response to said second water level indication signal to thereby interrupt the power supply from said turbine-driven generator to said second internal pump driving means.

19. A reactor core coolant flow rate control system for a boiling water reactor type nuclear power plant in which electric power is generated by a turbine-driven generator driven by a steam turbine rotating under the work of a main steam generated from a cooling water recirculated through a boiling water reactor, comprising:

internal pump driving means comprised of an electric motor driven by utilizing an electric power generated by said turbine-driven generator, a fluid coupling for transmitting an output torque of said electric motor, and a variable-frequency generator whose rotation number is changed in accordance with the torque transmitted by way of said fluid coupling;

a plurality of internal pumps for recirculating said cooling water, said internal pumps being electrically connected in parallel to said variable-frequency generator of said internal pump driving means and driven by an electric output power of said variable-frequency generator supplied to said internal pumps in parallel, and said internal pumps having a rotation number which changes in dependence on the rotation number of said variable-frequency generator; and control means for controlling said electric motor and said variable-frequency generator of said internal pump driving means;

wherein said control means includes:

memory means for storing a first conversion constant used in a normal operation for converting an output frequency of said variable-frequency generator to a voltage such that a ratio between a rated frequency and a rated voltage of said variable-frequency generator is one to one (1:1) and a second conversion constant having a value different from said first conversion constant used in a starting operation; and a control unit for controlling said electric motor and said variable-frequency generator of said internal pump driving means on the basis of a voltage obtained by converting the output frequency of said variable-frequency generator by using said second conversion constant stored in said memory means for starting operation of said internal pump driving means while controlling said electric motor and said variable-frequency generator of said internal pump driving means on the basis of a voltage obtained by converting the output frequency of said variable-frequency generator by using said first conversion constant when said internal pumps have attained a predetermined speed.

20. A reactor core coolant flow rate control system according to claim 19, said control unit of said control means including a timer for measuring a time lapsing from the starting of said internal pump driving means;

wherein decision is made that said internal pumps have reached a predetermined speed when said time measured by said timer has attained a predetermined time.

21. A reactor core coolant flow rate control system according to claim 19, said control unit of said control means including a timer for measuring a time lapsing from the starting of said internal pump driving means;

wherein when said time measured by said timer has reached a predetermined time, said electric motor and said variable-frequency generator of said internal pump driving means are controlled on the basis of a voltage obtained by converting the output frequency of said voltage frequency generator by using said first conversion constant stored in said memory means.

22. A reactor core coolant flow rate control system according to claim 19, further comprising:

fluid coupling control signal generating means for generating a fluid coupling control signal for said fluid coupling in response to at least one of deviation in a load and a rotation speed of said turbine-driven generator and deviation in a rotation speed of said internal pumps;

wherein said fluid coupling changes a transmission efficiency for the torque transmitted to said variable-frequency generator from said electric motor in response to said fluid coupling control signal.

23. A reactor core coolant flow rate control system according to claim 19, wherein said control unit of said control means controls said electric motor and said variable-frequency generator of said internal pump driving means on the basis of a voltage obtained by converting the output frequency of said variable-frequency generator by using a variable which varies at a predetermined rate of change as a function of time lapse from said second conversion constant to said first conversion constant when said internal pumps have attained the predetermined speed.

24. A reactor core coolant flow rate control system for a boiling water reactor type nuclear power plant in which electric power is generated by a turbine-driven generator driven by a steam turbine rotating under the work of a main steam generated from a cooling water recirculated through a boiling water reactor, comprising:

internal pump driving means comprised of an electric motor driven by utilizing an electric power generated by said turbine-driven generator, a fluid coupling for transmitting an output torque of said electric motor, and a variable-frequency generator whose rotation number is changed in accordance with the torque transmitted by way of said fluid coupling;

fluid coupling control signal generating means for generating a fluid coupling control signal for said fluid coupling in response to at least one of deviation in a load and a rotation speed of said turbine-driven generator and deviation in a rotation speed of internal pumps;

a plurality of internal pumps for recirculating said cooling water, said internal pumps being electrically connected in parallel to said variable-frequency generator of said internal pump driving means and driven by an electric output power of said variable-frequency generator supplied to said internal pumps in parallel, and said internal pumps having a rotation number which changes in dependence on the rotation number of said variable-frequency generator; and control means for controlling said electric motor and said variable-frequency generator of said internal pump driving means;

wherein said fluid coupling changes a transmission efficiency for the torque transmitted to said variable-frequency generator from said electric motor in response to said fluid coupling control signal; and wherein said control means decreases the torque transmitted to said internal pumps by inserting a resistance in a field circuit of said variable-frequency generator.

25. A reactor core coolant flow rate control system according to claim 24, said control unit of said control means including:

a timer for measuring a time lapsing from the starting of said internal pump driving means; and means for disconnecting said resistance from said field circuit of said variable-frequency generator when said time measured by said timer has attained a predetermined time.

26. A reactor core coolant flow rate control system for a boiling water reactor type nuclear power plant in which electric power is generated by a turbine-driven generator driven by a steam turbine rotating under the work of a main steam generated from a cooling water recirculated through a boiling water reactor, comprising:

internal pump driving means comprised of an electric motor driven by utilizing an electric power generated by said turbine-driven generator, an AC exciter connected to said electric motor, a fluid coupling for transmitting an output torque of said electric motor, and a variable-frequency generator whose rotation number is changed in accordance with the torque transmitted by way of said fluid coupling;

fluid coupling control signal generating means for generating a fluid coupling control signal for said fluid coupling in response to at least one of deviation in a load and a rotation speed of said turbine-driven generator and deviation in a rotation speed of internal pumps;

a plurality of internal pumps for recirculating said cooling water, said internal pumps being electrically connected in parallel to said variable-frequency generator of said internal pump driving means and driven by an electric output power of said variable-frequency generator supplied to said internal pumps in parallel, and said internal pumps having a rotation number which changes in dependence on the rotation number of said variable-frequency generator; and control means for controlling said electric motor and said variable-frequency generator of said internal pump driving means;

wherein said fluid coupling changes a transmission efficiency for the torque transmitted to said variable-frequency generator from said electric motor in response to said fluid coupling control signal; and wherein said control means decreases the torque transmitted to said internal pumps by inserting a resistance in a field circuit of said AC exciter.

27. A reactor core coolant flow rate control system according to claim 26, said control unit of said control means including:

a timer for measuring a time lapsing from the starting of said internal pump driving means; and means for disconnecting said resistance from said AC exciter of said variable-frequency generator when said time measured by said timer has attained a predetermined time.

28. A reactor core coolant flow rate control system for a boiling water reactor type nuclear power plant in which electric power is generated by a turbine-driven generator driven by a steam turbine rotating under the work of a main steam generated from a cooling water recirculated through a boiling water reactor, comprising:

internal pump driving means comprised of an electric motor driven by utilizing an electric power generated by said turbine-driven generator, a variable torque transmission means for transmitting an output torque of said electric motor, and a variable-frequency generator whose rotation number is changed in accordance with the torque transmitted by way of said fluid coupling;

a plurality of internal pumps for recirculating said cooling water, said internal pumps being electrically connected in parallel to said variable-frequency generator of said internal pump driving means and driven by an electric output power of said variable-frequency generator supplied to said internal pumps in parallel, and said internal pumps having a rotation number which changes in dependence on the rotation number of said variable-frequency generator.

\* \* \* \* \*